United States Patent
Martin et al.

(10) Patent No.: US 10,093,177 B2
(45) Date of Patent: Oct. 9, 2018

(54) COMPACT PLANETARY WHEEL DRIVE

(71) Applicant: FAIRFIELD MANUFACTURING COMPANY, INC., Lafayette, IN (US)

(72) Inventors: Scott Martin, Battle Ground, IN (US); Matthew Richards, West Lafayette, IN (US); Randolph Dozier, Daleville, VA (US)

(73) Assignee: FAIRFIELD MANUFACTURING COMPANY, INC., West Lafayette, IN (US)

( * ) Notice: Subject to any disclaimer, the term of this patent is extended or adjusted under 35 U.S.C. 154(b) by 0 days.

(21) Appl. No.: 15/451,325

(22) Filed: Mar. 6, 2017

(65) Prior Publication Data

US 2018/0251024 A1   Sep. 6, 2018

(51) Int. Cl.
*B60K 17/04* (2006.01)
*F16H 1/46* (2006.01)

(52) U.S. Cl.
CPC ............. *B60K 17/046* (2013.01); *F16H 1/46* (2013.01)

(58) Field of Classification Search
CPC ................................ B60K 17/046; F16H 1/46
See application file for complete search history.

(56) References Cited

U.S. PATENT DOCUMENTS

| | | | |
|---|---|---|---|
| 4,365,525 A * | 12/1982 | Imazaike | G11B 15/67571 192/20 |
| 5,616,097 A * | 4/1997 | Dammon | F16H 1/46 180/374 |
| 6,852,061 B2 | 2/2005 | Schoon | |
| 7,866,444 B2 | 1/2011 | Aldridge | |
| 7,954,574 B2 | 6/2011 | Schoon | |
| 8,056,662 B2 | 11/2011 | Schoon et al. | |
| 8,133,143 B2 * | 3/2012 | Schoon | H02K 7/1025 180/371 |
| 8,323,143 B2 | 12/2012 | Schoon | |
| 8,449,424 B2 | 5/2013 | Schoon | |
| 8,556,761 B1 | 10/2013 | Carlton | |
| 8,561,732 B2 | 10/2013 | Schoon | |
| 8,662,277 B2 | 3/2014 | Schoon | |
| 8,808,133 B2 | 8/2014 | Carlton et al. | |
| 8,866,421 B2 | 10/2014 | Kamatani et al. | |
| 9,079,207 B2 | 7/2015 | Simpson | |
| 9,174,525 B2 | 11/2015 | Caron | |
| 9,353,800 B2 | 5/2016 | Carlton et al. | |
| 9,387,544 B2 | 7/2016 | Phebus et al. | |

(Continued)

OTHER PUBLICATIONS

Martin et al., Planetary Wheel Drive Brake, U.S. Appl. No. 15/451,343, filed Mar. 6, 2017, Applicant: Fairfield Manufacturing Company, Inc.

(Continued)

*Primary Examiner* — David J Hlavka
(74) *Attorney, Agent, or Firm* — Woodling, Krost and Rust

(57) ABSTRACT

A compact planetary wheel drive uses a high speed input planet carrier partially residing with a stationary spindle, and, an input planet gear engaging an internal ring gear within the stationary spindle. Inclusion of the input planet gear within the stationary spindle enables use of an additional stage of the planetary wheel drive while keeping the planetary wheel compact. Two and three stage planetaries may be accommodated with use of the same internal output ring gear of the rotatable output housing.

20 Claims, 22 Drawing Sheets

(56) References Cited

U.S. PATENT DOCUMENTS

| | | |
|---|---|---|
| 9,429,227 B2 | 8/2016 | Noerenberg |
| 9,853,523 B2 | 12/2017 | Caron et al. |
| 9,856,920 B2 | 1/2018 | Phebus et al. |
| 9,878,607 B2 | 1/2018 | Caron |
| 2006/0070778 A1* | 4/2006 | De Veny .............. B60K 7/0007 180/65.1 |
| 2013/0324354 A1* | 12/2013 | Phebus ................ F16H 1/2818 475/348 |

OTHER PUBLICATIONS

Martin et al., Planetary Wheel Drive Using Bushings, U.S. Appl. No. 15/451,350, filed Mar. 6, 2017, Applicant: Fairfield Manufacturing Company, Inc.
Martin et al., Planetary Wheel Drive Single Wall Lugged Output Carrier, U.S. Appl. No. 15/451,360, filed Mar. 5, 2017, Applicant: Fairfield Manufacturing Company, Inc.
Martin et al., Planetary Wheel Drive Using Thrust Washer—Cover Arrangement, U.S. Appl. No. 15/451,337, filed Mar. 6, 2017, Applicant: Fairfield Manufacturing Company, Inc.
Phebus et al., Smilled Spline Apparatus and Smilling Process for Manufacturing the Smilled Spline Apparatus, U.S. Appl. No. 15/206,256, filed Jul. 9, 2016, Applicant: Fairfield Manufacturing Company, Inc.

\* cited by examiner

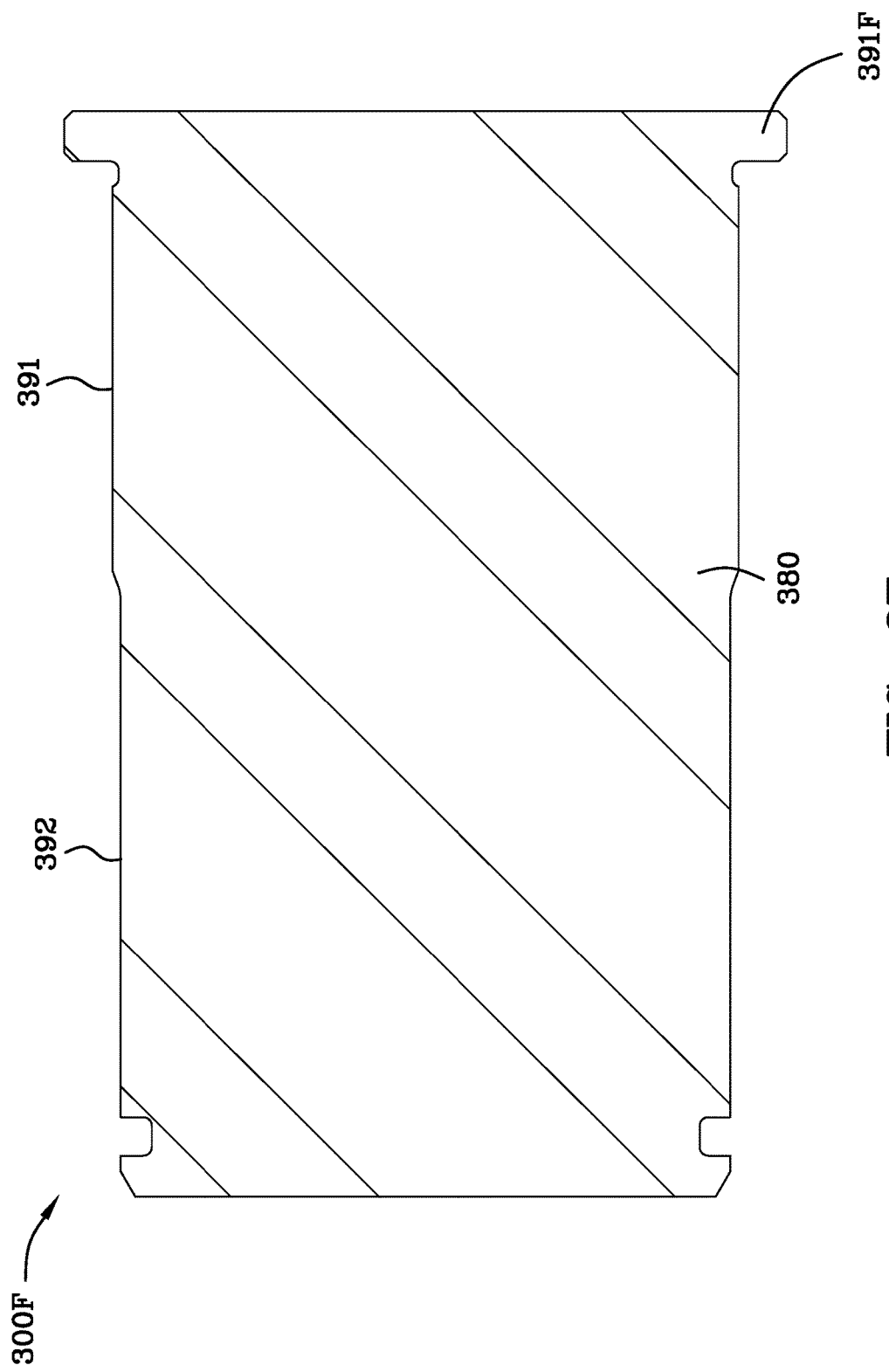

COMPACT PLANETARY WHEEL DRIVE

FIELD OF THE INVENTION

The invention is in the field of planetary wheel drives for the mobile equipment aerial work platform industry.

SUMMARY OF THE INVENTION

In a planetary wheel drive, it is an object to provide a high speed carrier thrust washer to take axial thrust from a planet gear.

In a planetary wheel drive, it is an object to take high speed carrier thrust between a planet gear and cover using a thrust washer and thrust plate.

In a planetary wheel drive, it is an object to take high speed carrier thrust between a planet gear and cover using a thrust washer and thrust plate wherein the planet gear, thrust plate and thrust washer all rotate at different relative speeds while thrust washer is fixed to the cover.

In a planetary wheel drive, it is an object to take high speed carrier thrust between a planet gear and cover using a thrust washer and thrust plate wherein the washer is slip fit on the cover.

In a planetary wheel drive, it is an object to take high speed carrier thrust between a planet gear and cover using a thrust washer and thrust plate wherein the thrust plate rotates with a planet carrier.

In a planetary wheel drive, it is an object to take high speed carrier thrust between a planet gear and cover using a thrust washer and thrust plate wherein the thrust plate is affixed to a planet carrier and rotates with the planet carrier.

In a planetary wheel drive, it is an object to provide a fixed output carrier.

In a triple planetary wheel drive, it is an object of the invention to a high speed carrier and ring gear integrated into a spindle between a spring applied hydraulic released parking brake and a fixed output carrier.

In a triple planetary wheel drive, it is an object to provide a high speed carrier partially within a spindle such that the overall length of the planetary wheel drive is minimized allowing use of the same ring gear for examples having double and triple planetary reductions.

In a planetary wheel drive, it is an object to provide a triple planetary with a high speed ring gear in the spindle under the main bearings or bushings.

In a triple planetary wheel drive, it is an object to provide a high speed ring gear in the spindle under the main bearings or bushings wherein planet gears are driven by and input sun.

In a triple planetary wheel drive, it is an object to provide an input stage which is located between a brake and the output stage.

In a triple planetary wheel drive, it is an object to provide, in the input stage, an external spline that engages the intermediate stage sun gear near the cover.

In a triple planetary wheel drive, it is an object to provide, in the input stage, a high speed carrier which is cantilevered, and has pressed in planet pins.

In a triple planetary wheel drive, it is an object to provide, in the input stage, bushings pressed into the planet gear bores.

In a triple planetary wheel drive, it is an object to provide a fixed output carrier.

In a planetary wheel drive, it is an object to provide a stationary spindle and a rotatable output housing wherein: a first main bushing interposed between the stationary spindle and the rotatable output housing; a second main bushing interposed between the stationary spindle and the rotatable output housing: the first main bushing includes a first flange; the second main bushing includes a second flange; and, the first main bushing and the second main bushings are affixed to the rotatable housing.

In a planetary wheel drive, it is an object to provide bushings in place of rolling element bearings to affix the planet gears to planet pins.

In a planetary wheel drive, it is an object to reduce machining in the planet bores which receive the bushings.

In a planetary wheel drive, it is an object to press the bushings into the planet gear bores and relative motion is between the bushing and the planet pins.

In a planetary wheel drive, it is an object to press flanged bushings into the planet gear bores such that the bushings react to carry relative motion of tangential loads, and also act to carry axial loads on the planet gears.

In a planetary wheel drive, it is an object to provide pressed flanged bushings into the planet gear bores so as to separate the planet gears from the respective planetary carriers.

In a planetary wheel drive, it is an object to press the bushings in the planet gear bores and relative motion is between the bushings and the planet pins.

In a planetary wheel drive, it is an object to provide an output planetary carrier assembly with pressed planet pins through planet holes located in an interrupted splined connection in a single wall carrier.

In a planetary wheel drive, it is an object to provide an output planetary carrier assembly with a lugged bearing nut locking device which cooperates with the output carrier to prevent the notched bearing nut from disengaging the spindle.

In a planetary wheel drive, it is an object to provide an output planetary carrier assembly with a lugged bearing nut locking device which cooperates with the output carrier to prevent the lugged bearing nut from disengaging the spindle wherein locking lugs keep the bearing nut retention from backing off and allow for easy disassembly of the unit for service.

In a planetary wheel drive, it is an object to provide an output planetary carrier assembly with a lugged bearing nut locking device.

In a planetary wheel drive, it is an object to provide an output planetary carrier assembly with a bolt-on planet gear thrust plate of planet gears with planet bushings.

In a planetary wheel drive, it is an object to provide a carrier sub assembly that can offer high performance with low cost by having carrier strength and stiffness required to perform.

In a planetary wheel drive, it is an object to provide an interrupted single wall output carrier spline fixed to the spindle which cooperates with planet gears and a thrust plate which creates system stiffness under load.

In a planetary wheel drive, it is an object to provide to planet pins having flanged heads pressed into the carrier.

In a planetary wheel drive, it is an object to provide an output carrier which reacts output torque from through the carrier splines to the internal ring gear of the spindle.

In a planetary wheel drive, it is an object to provide a spring applied hydraulic release parking brake utilizing using a single stamping with a plurality of springs affixed to the single stamping.

In a planetary wheel drive, it is an object to provide a turned spring pocket piston.

In a planetary wheel drive, it is an object to provide a brake piston with a turned spring pocket diameter for a spring pack.

In a planetary wheel drive, it is an object to incorporate a spring pack comprised of coil springs that are mechanically bonded to the stamped single plate.

In a planetary wheel drive, it is an object to provide a spring pack which reacts between a pressure plate and a brake piston to compress the brake friction pack into the thrust plate.

In a planetary wheel drive, it is an object to provide a brake which is released by hydraulic pressure that seals on the outer diameter of the brake piston and is sealed by quad ring sealing elements.

BRIEF DESCRIPTION OF THE DRAWINGS

FIG. 3F is an enlarged portion of FIG. 3B illustrating the pin.

DESCRIPTION OF THE INVENTION

Figure 1:
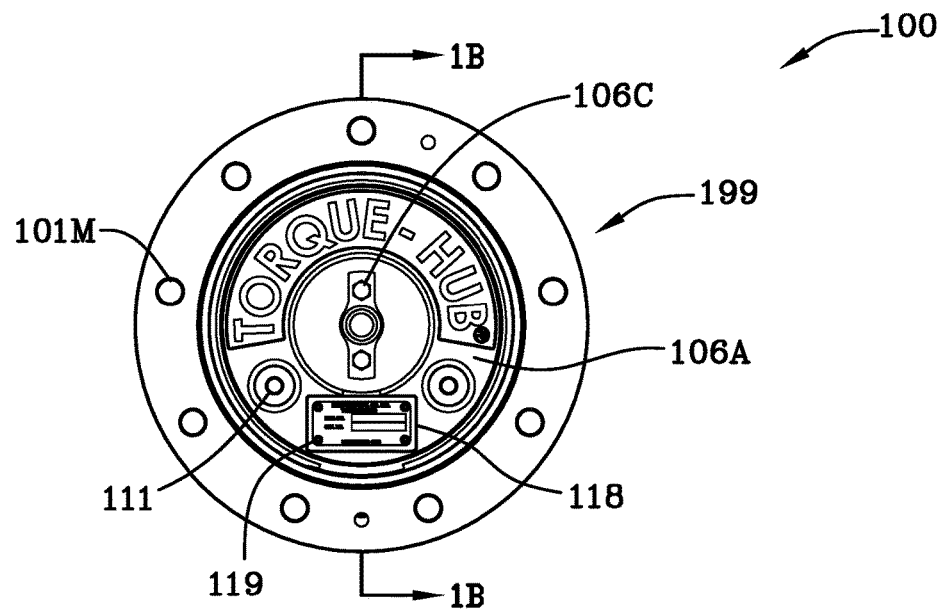
FIG. 1 is an end view of a first example of the planetary wheel drive shown in FIG. 1J.
Figure 1A:
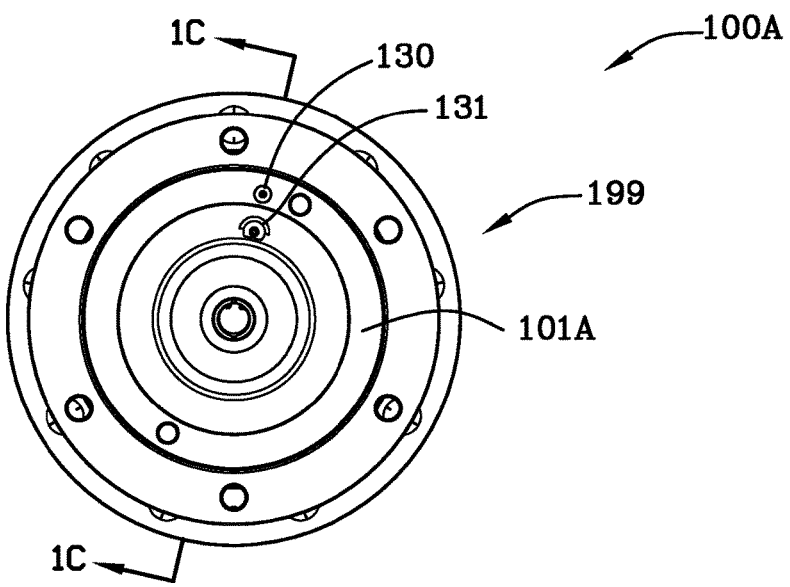
FIG. 1A is another end view of a planetary wheel drive shown in FIG. 1J.
Figure 1B:
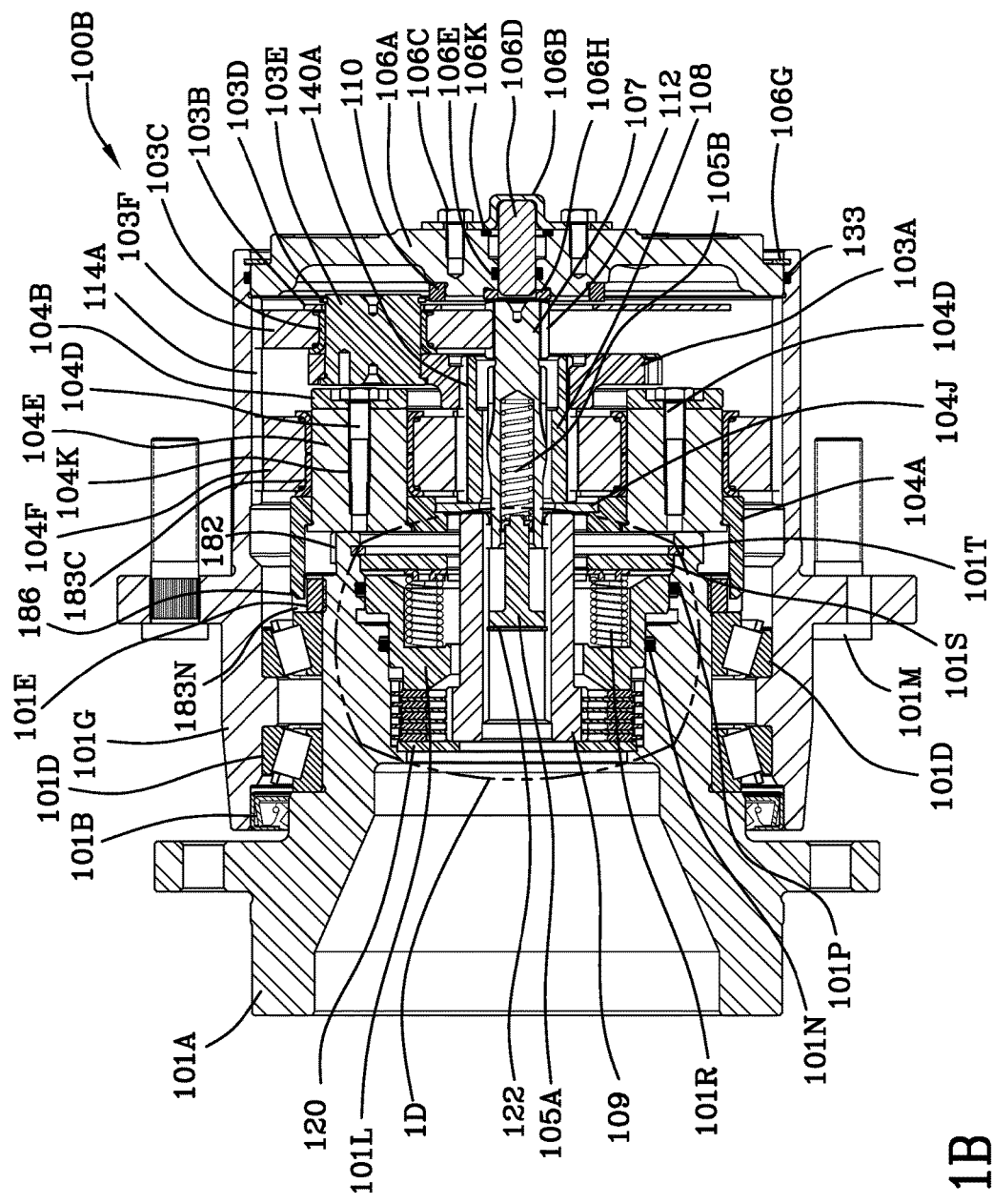
FIG. 1B is a cross-sectional view of the first example of the planetary wheel drive taken along the lines 1B-1B of FIG. 1.
Figure 1C:
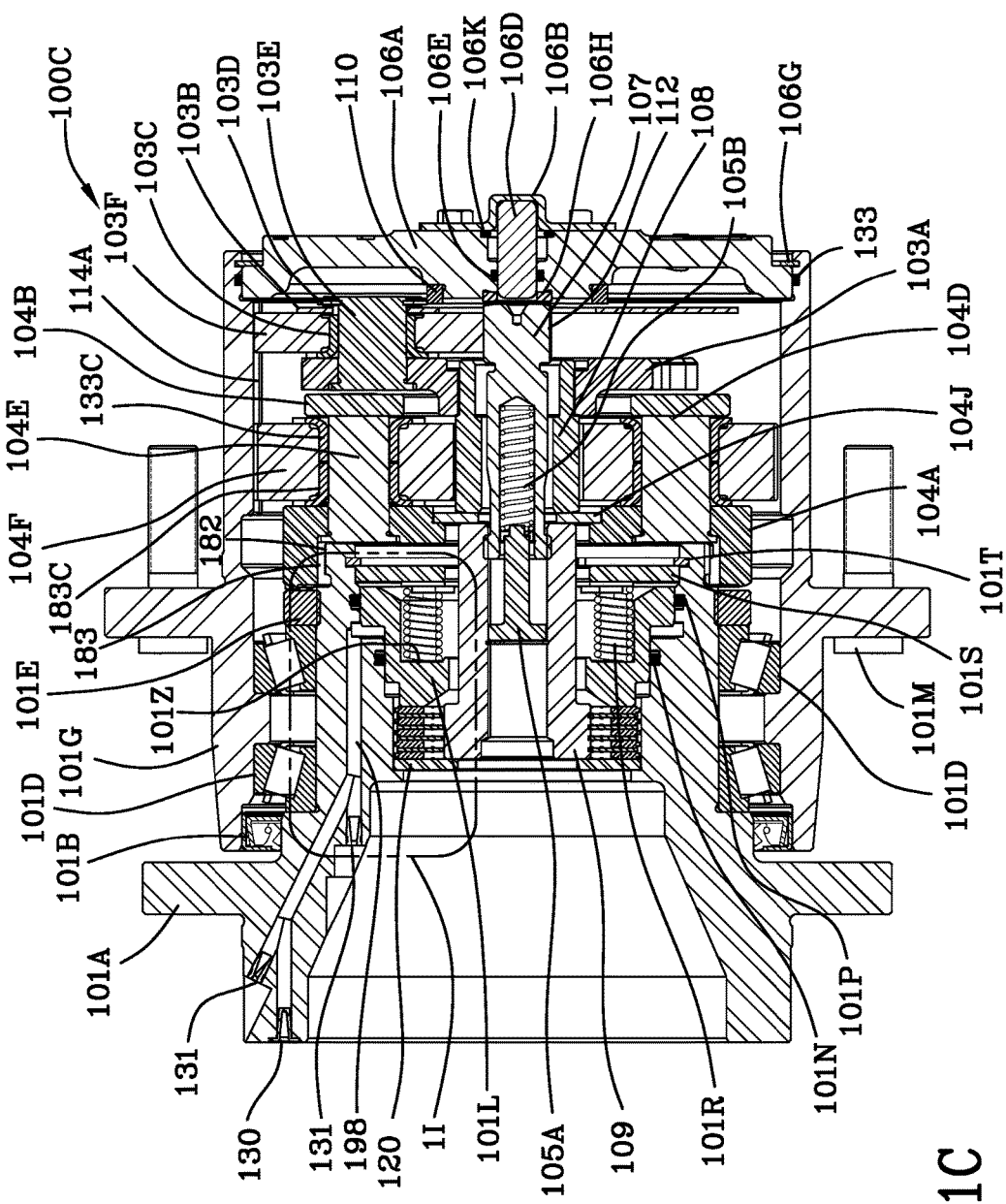
FIG. 1C is a cross-sectional view of the first example of the planetary wheel drive taken along the lines 1C-1C of FIG. 1A.
Figure 1D:
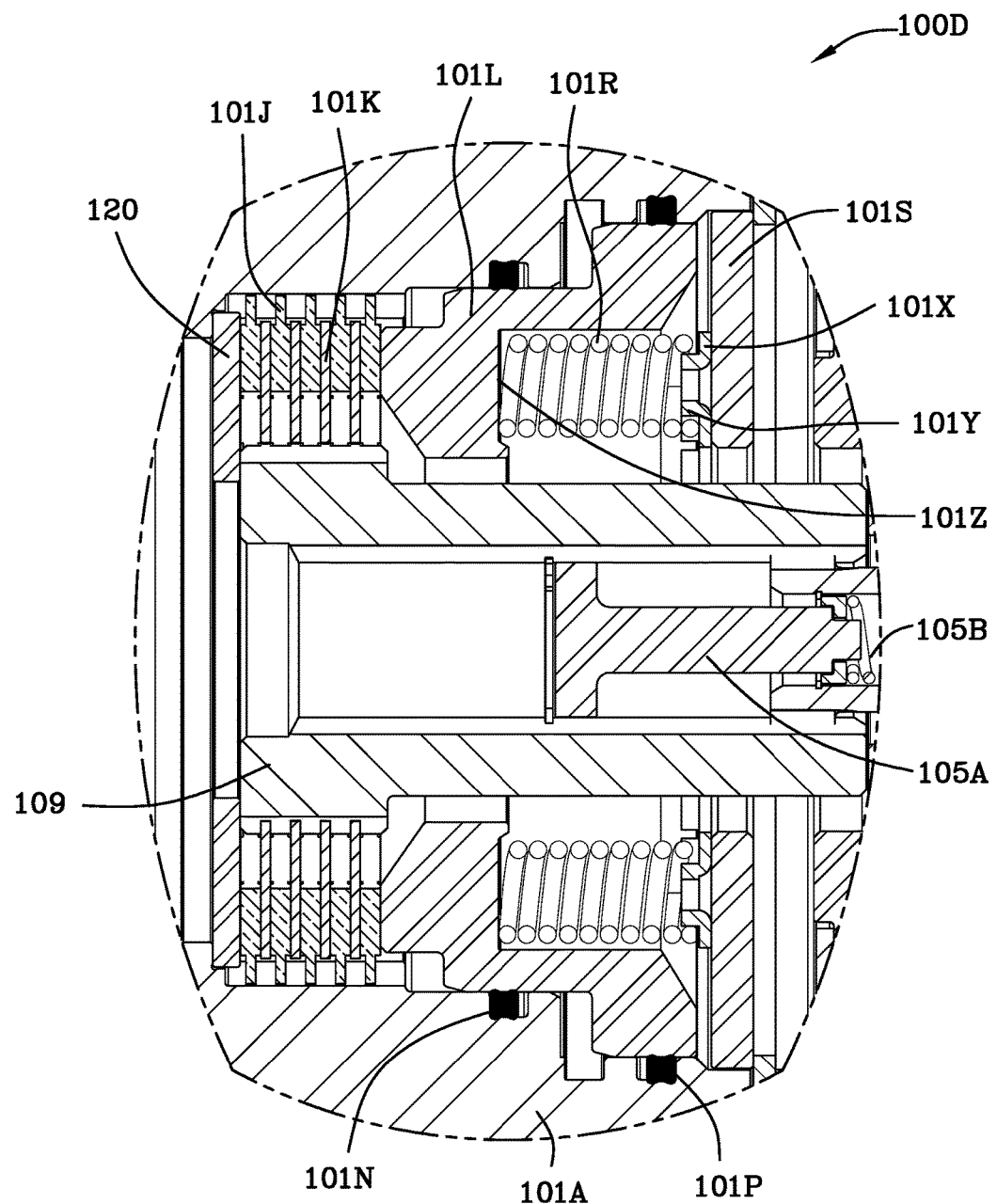
FIG. 1D is an enlargement of a portion of FIG. 1B illustrating the brake arrangement.
Figure 1E:
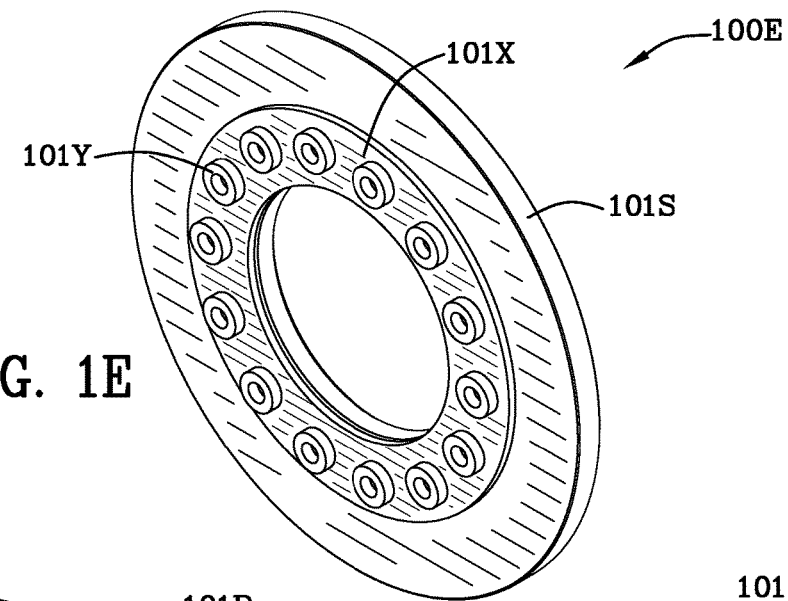
FIG. 1E is a perspective view of the stamped brake plate and pressure plate.
Figure 1F:
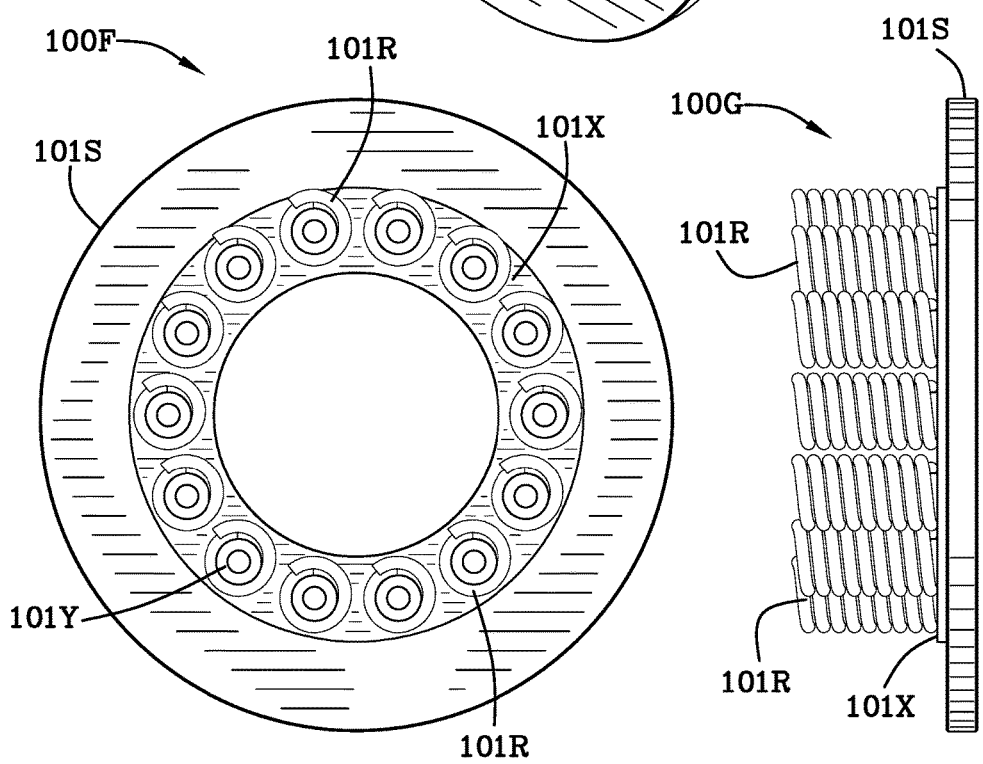
FIG. 1F is an end view of the stamped brake plate, pressure plate and coil springs mechanically bonded to the stamped brake plate.
Figure 1G:
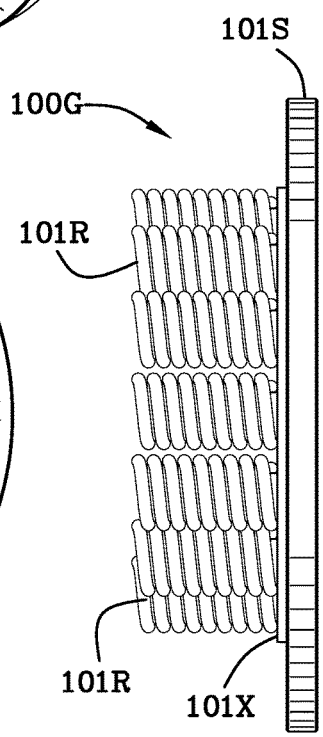
FIG. 1G is a side view of the stamped brake plate, pressure plate and coil springs.
Figure 1H:
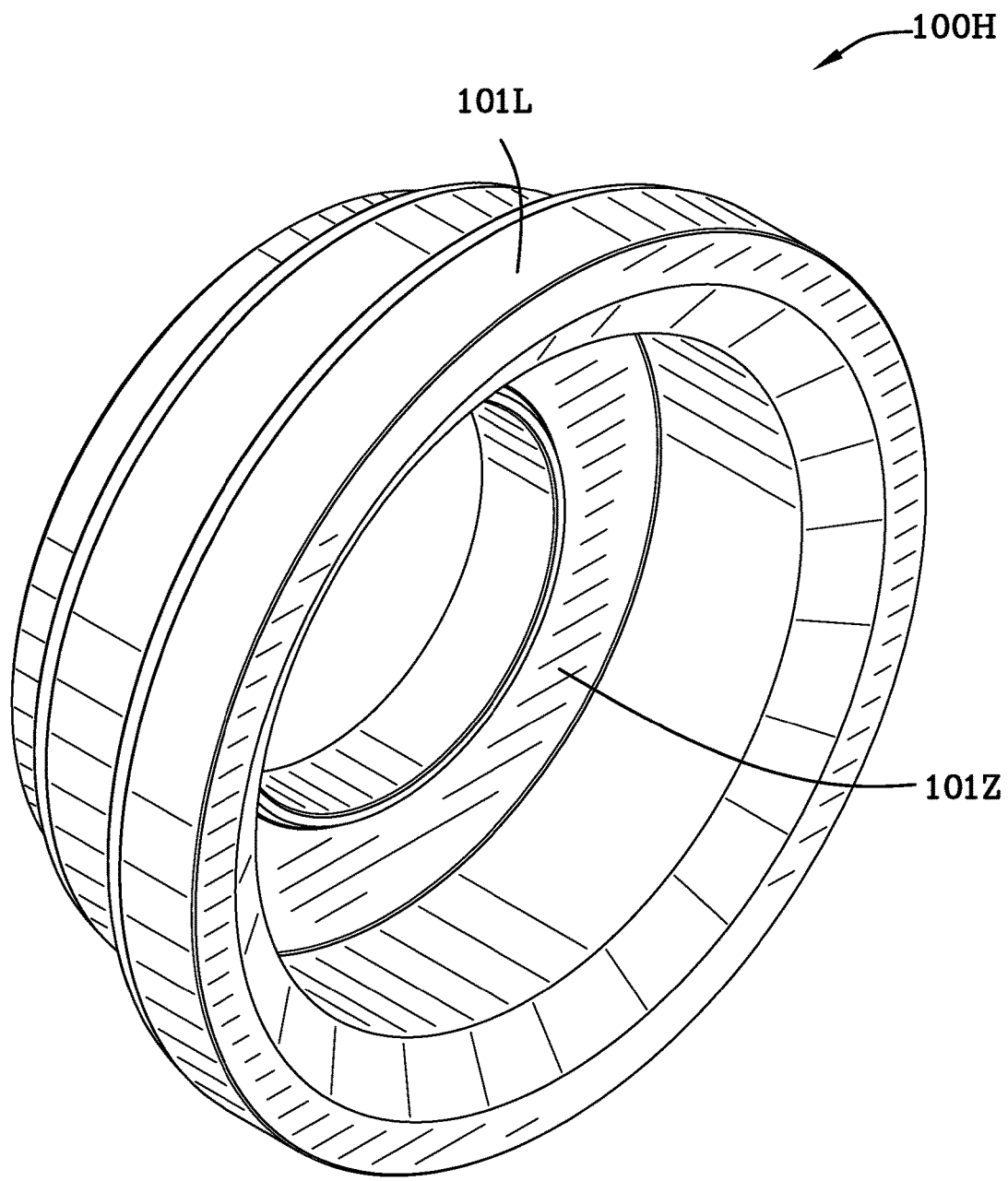
FIG. 1H is a perspective view of the brake piston.
Figure 1I:
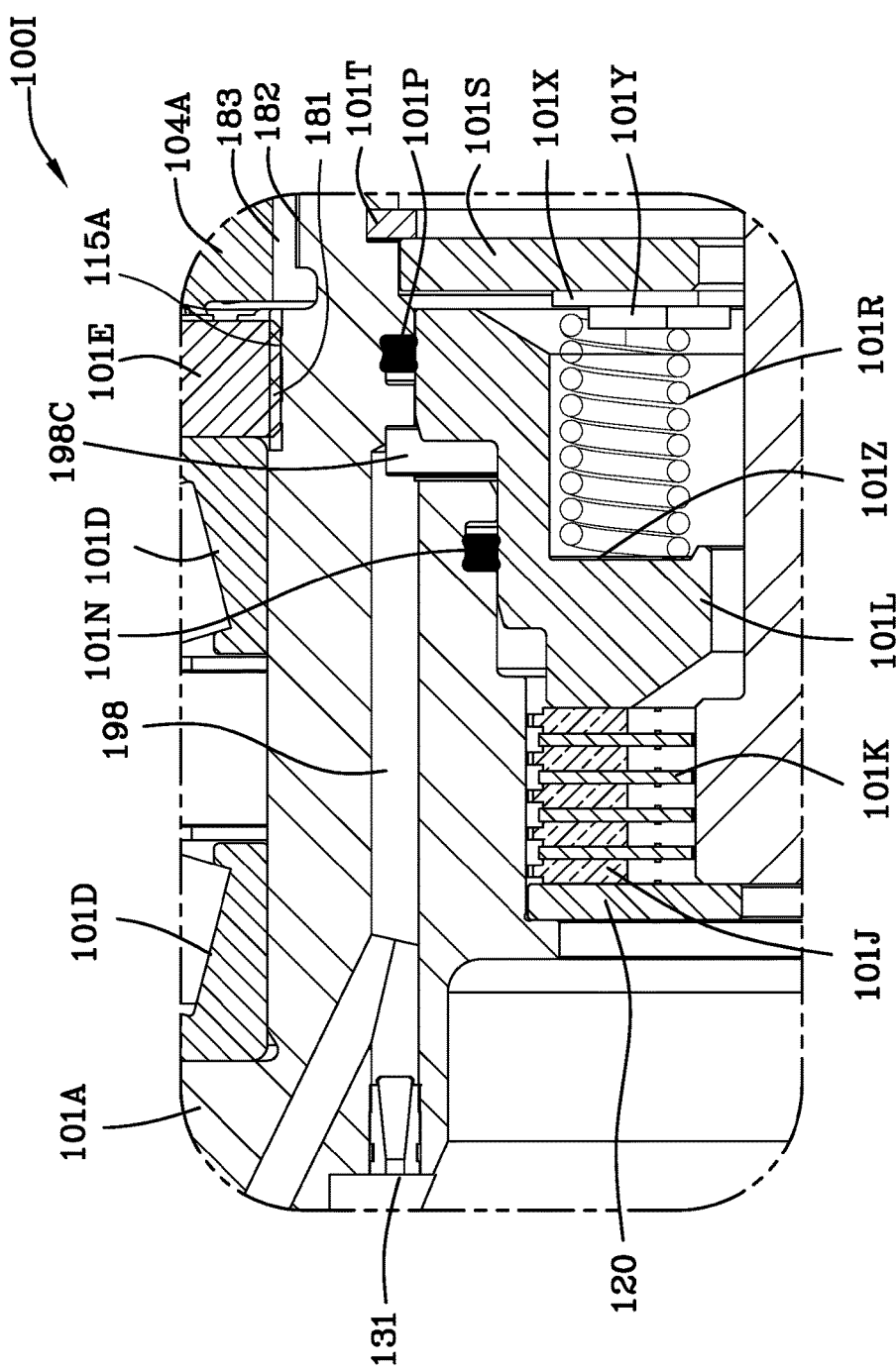
FIG. 1I is an enlargement of a portion of FIG. 1C illustrating the brake arrangement.
Figure 1J:
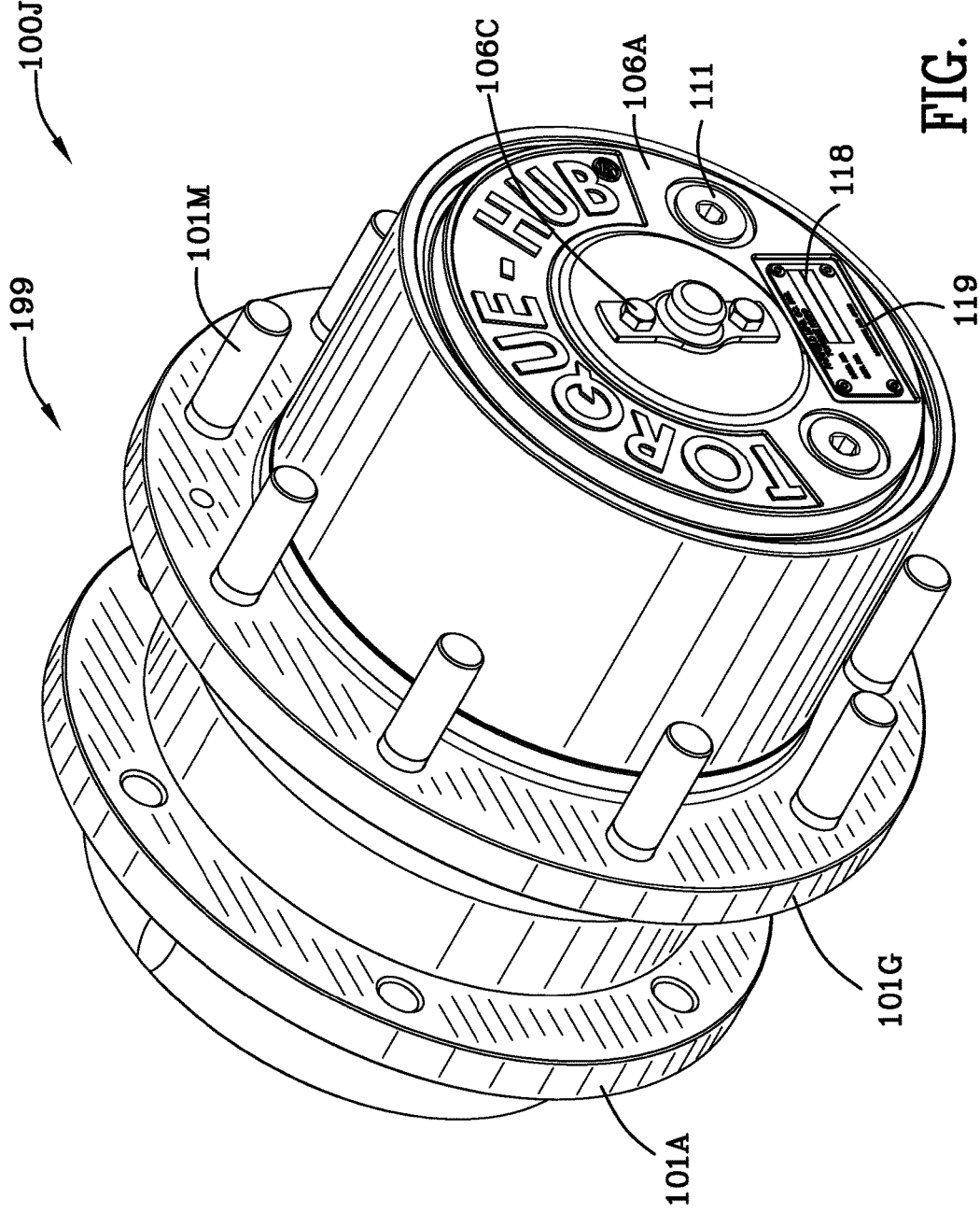
FIG. 1J is a perspective view of a planetary wheel drive.
Figure 2:
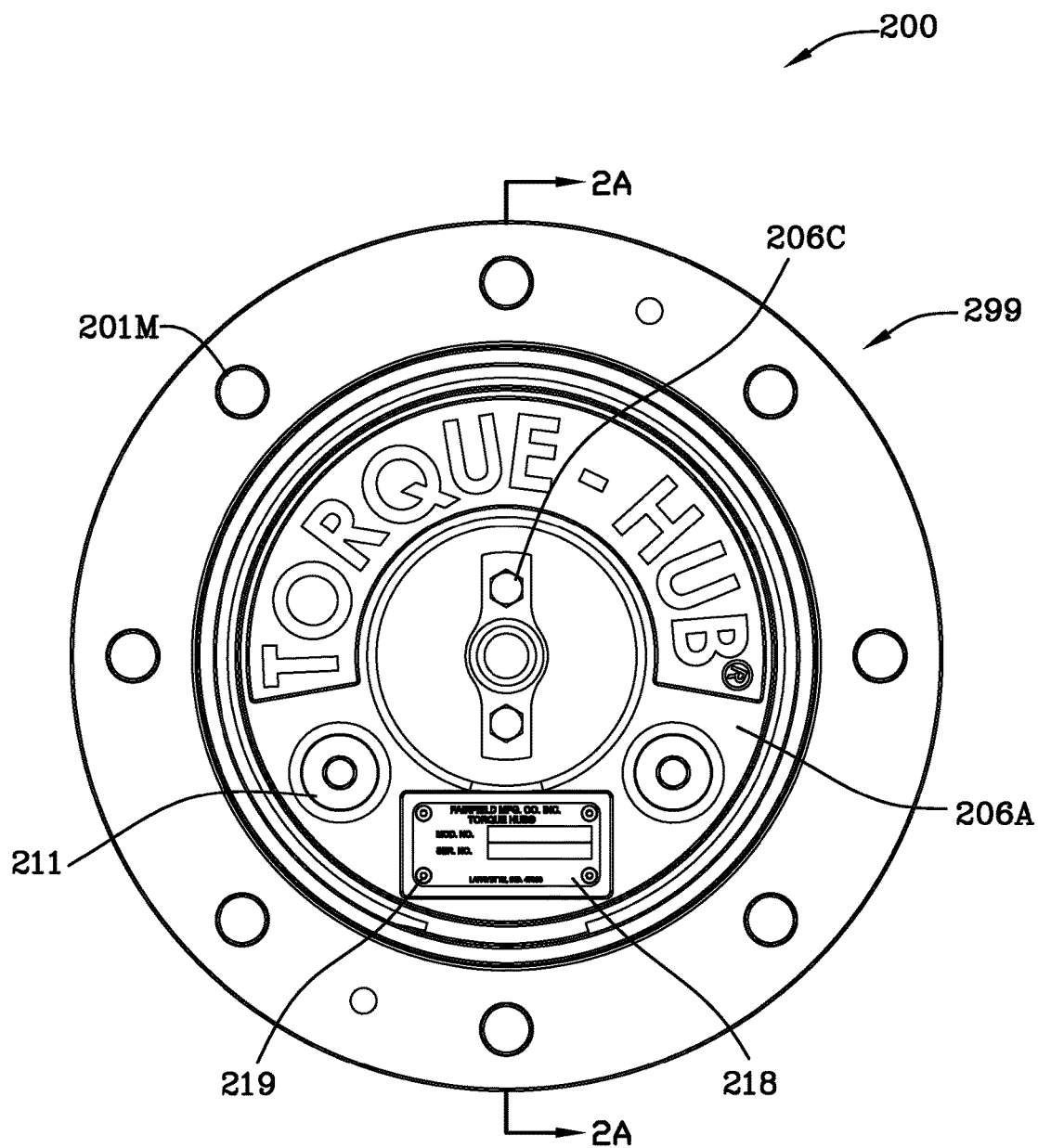
FIG. 2 is an end view of the second example of a planetary wheel drive.
Figure 2A:
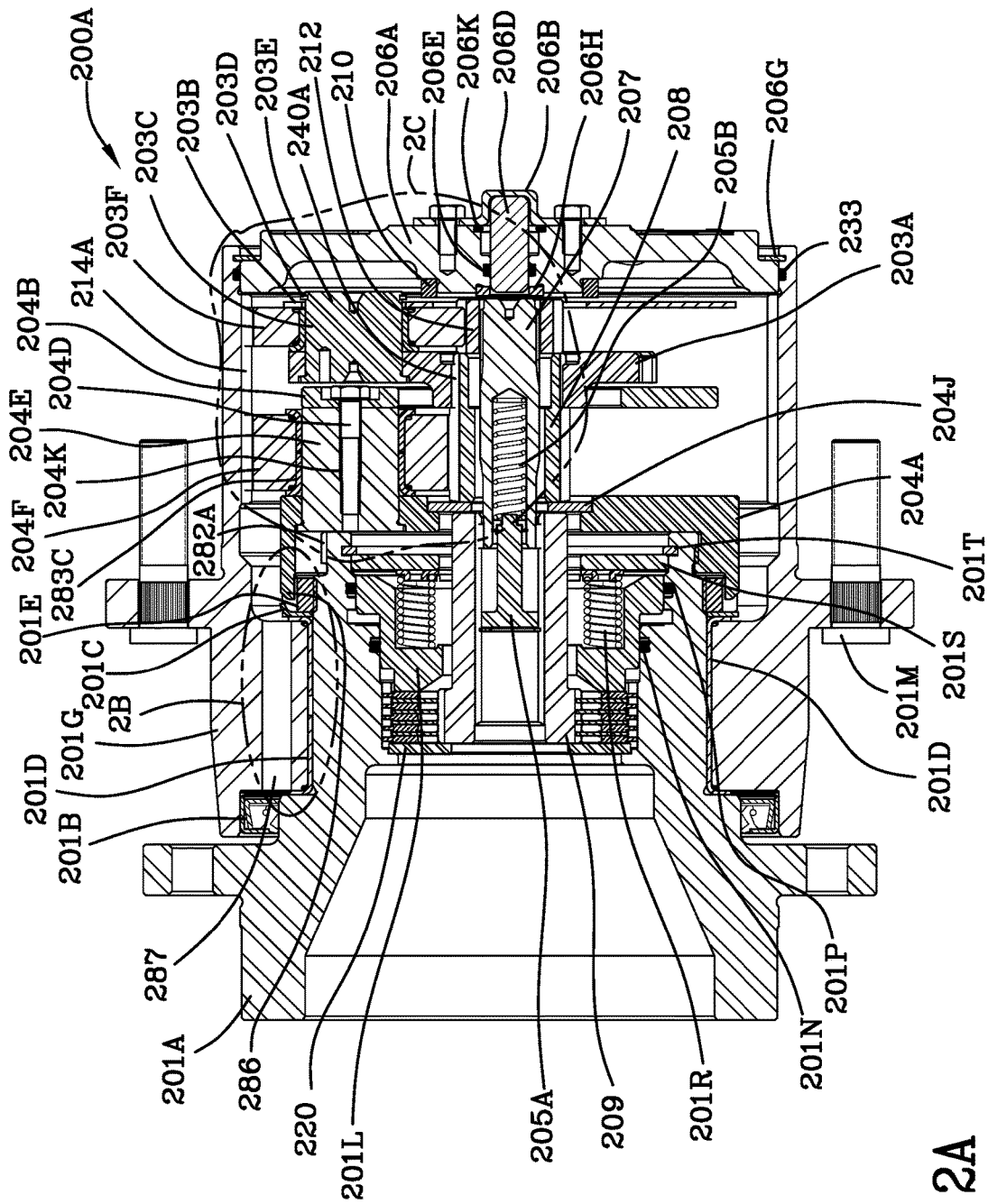
FIG. 2A is a cross-sectional view taken along the lines 2A-2A of FIG. 2.
Figure 2B:
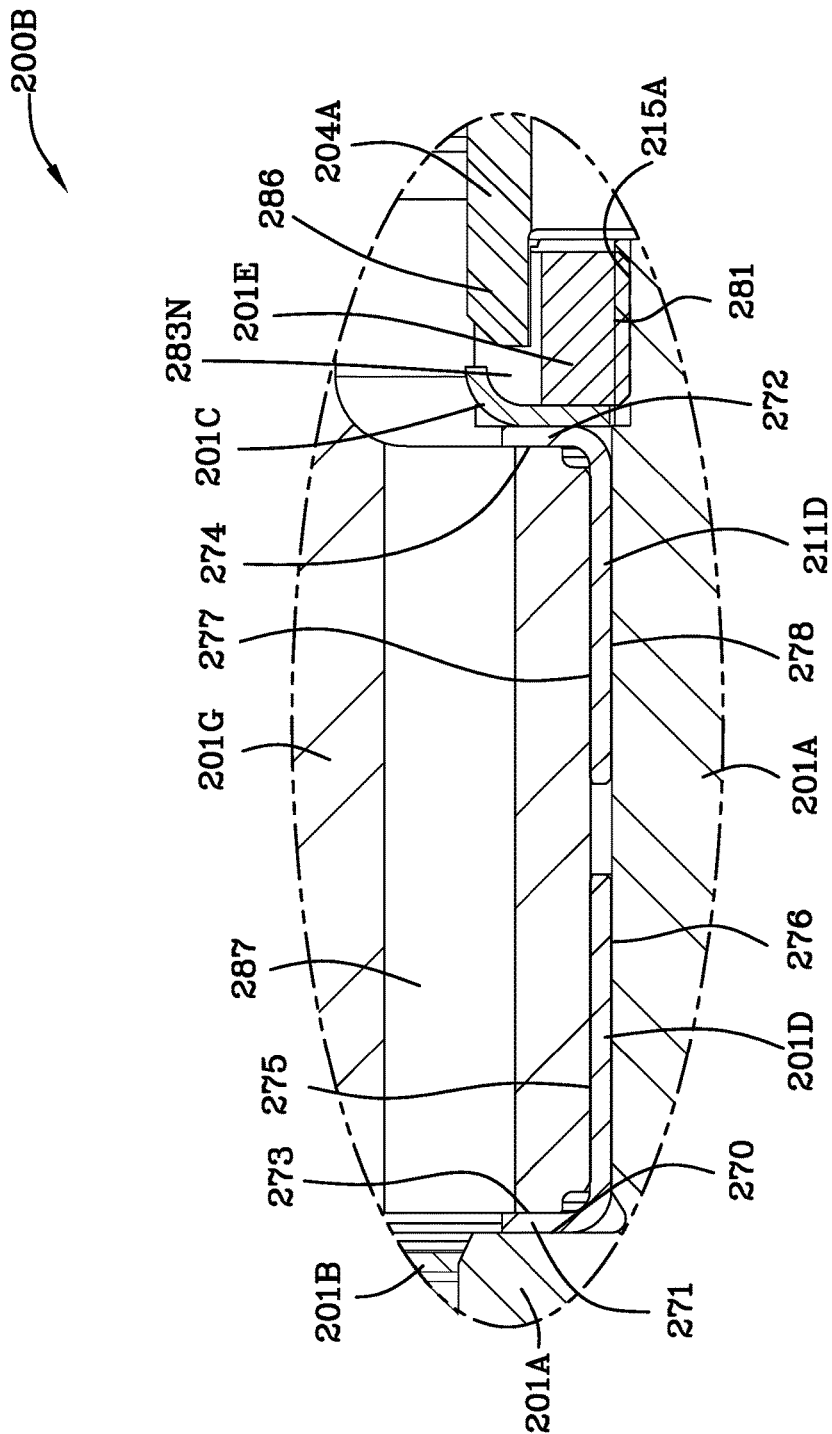
FIG. 2B is an enlargement of a portion of FIG. 2A illustrating the main bearings between the output housing and the spindle

FIGS. 1-1J set forth a first example of the invention. FIGS. 2-2E set forth a second example of the invention. FIGS. 1-1J and FIGS. 2-2E are double planetary wheel drives. The first and second examples differ in that the second example uses a main bushing instead of bearings. The second example also uses a different rotatable output housing which accommodates the main bushings. The first and second examples are otherwise the substantially similar. Therefore, to avoid duplication and unnecessary repetition in the specification, description of the common structure and function is in most instances not repeated and the description of the common structural aspects and function of one of the examples is equally applicable to the other example that is not described with as much detail and specificity.

Figure 2E:
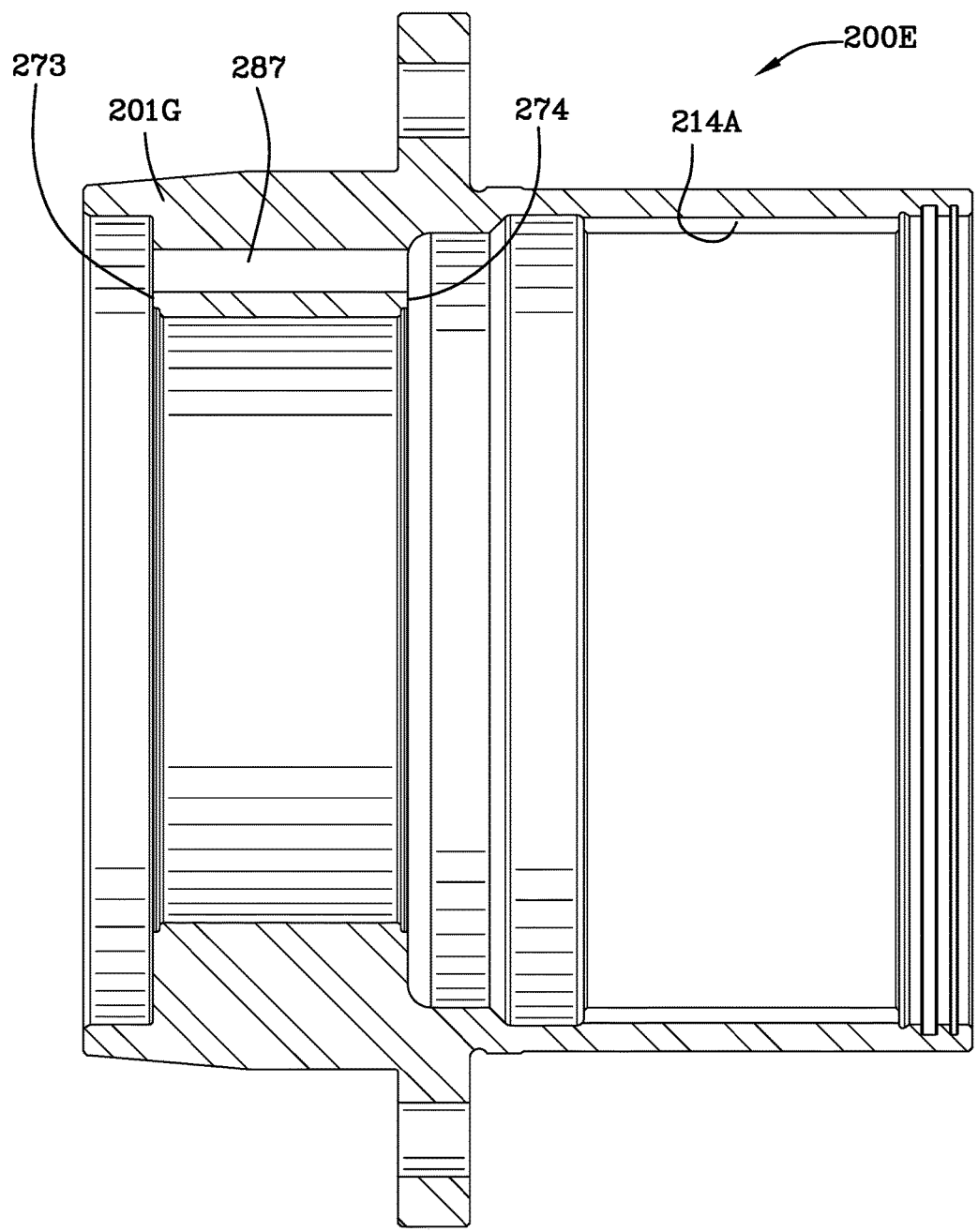
FIG. 2E is a cross-sectional view of the rotatable output housing.
Figure 3:
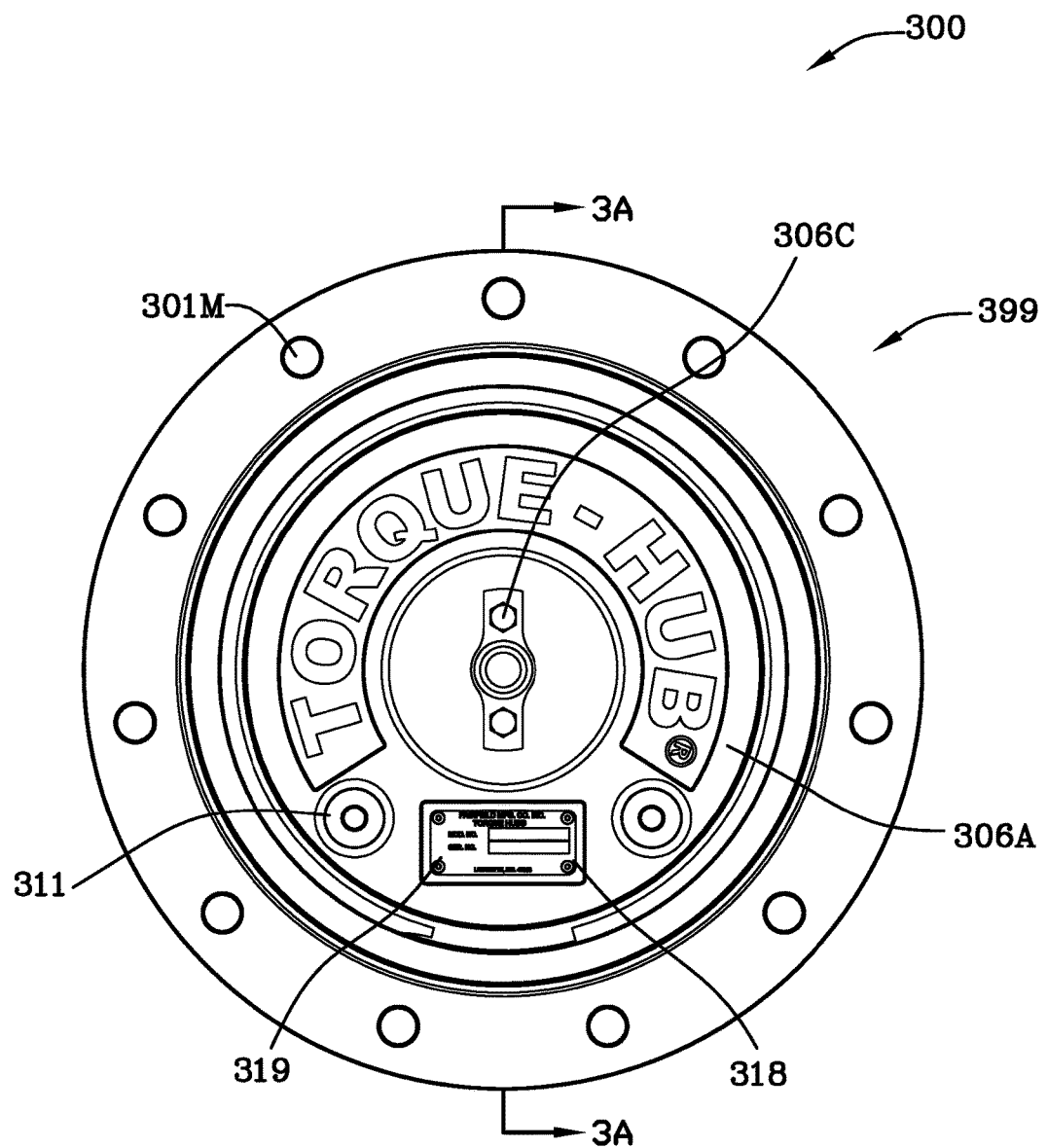
FIG. 3 is an end view of a third example of the planetary wheel drive.
Figure 3A:
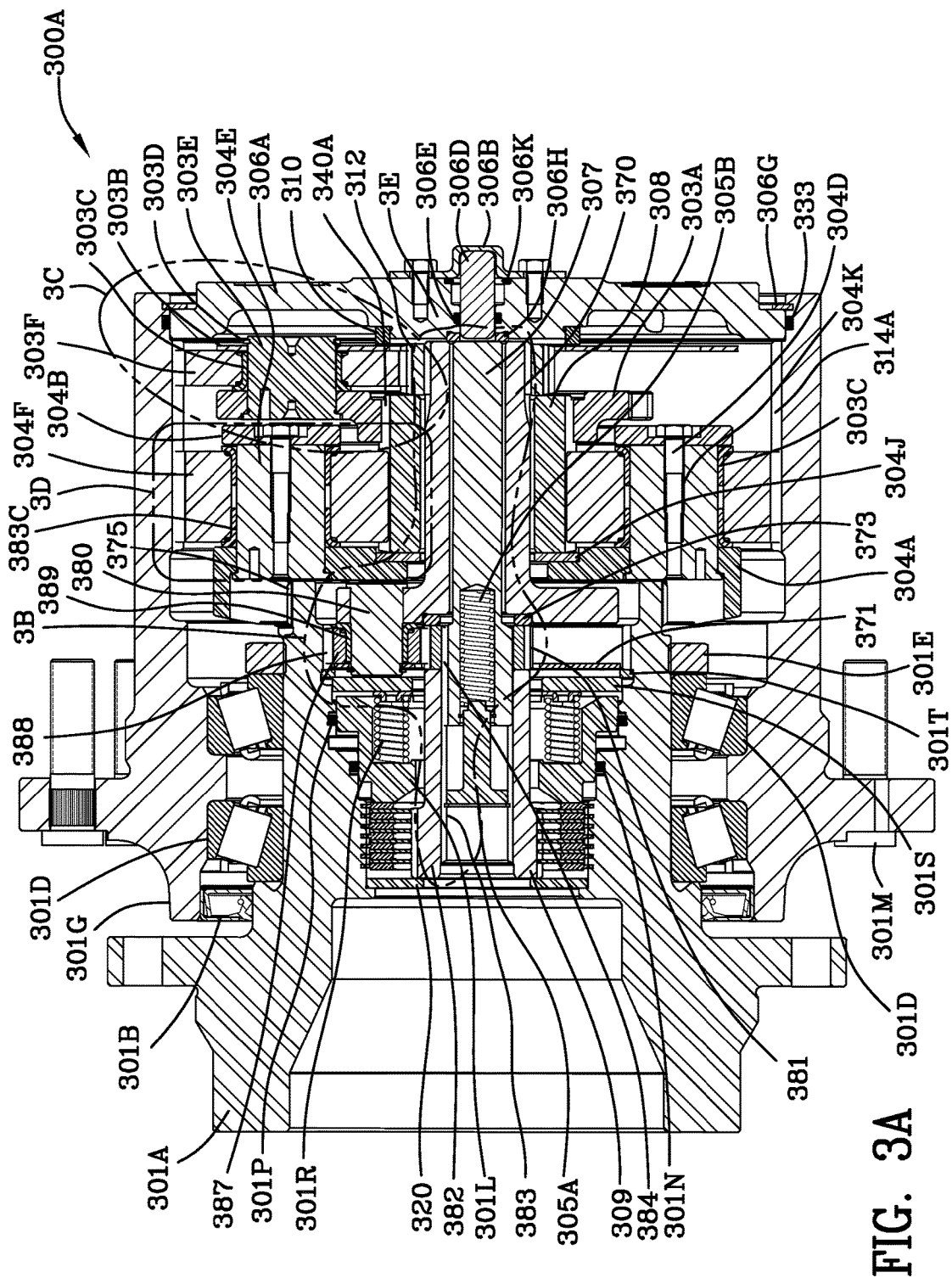
FIG. 3A is a cross-sectional view of the third example of the planetary wheel drive taken along the lines 3A-3A of FIG. 3.
Figure 3B:
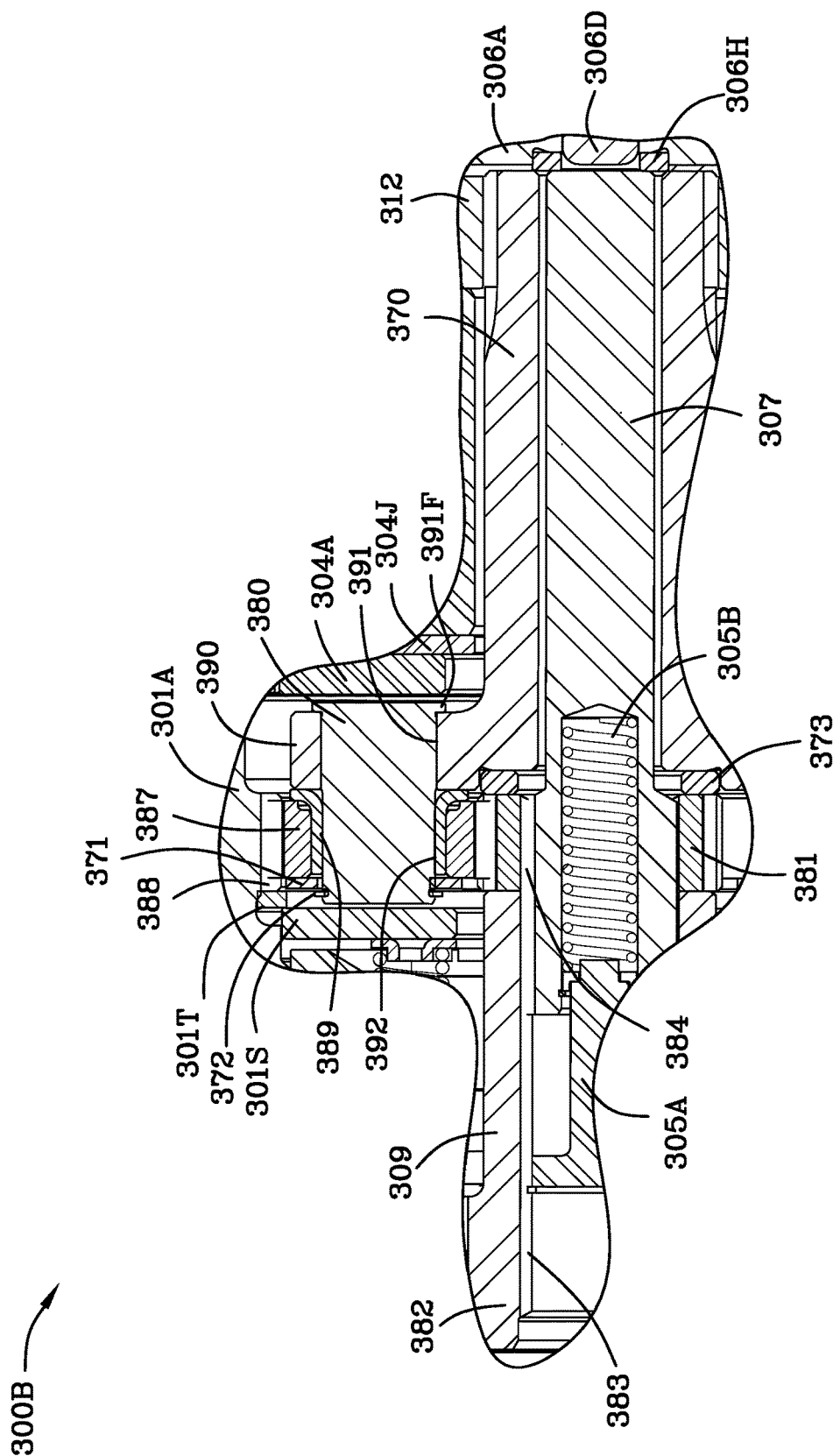
FIG. 3B is an enlarged portion of FIG. 3A illustrating the input sun, input planet gear, input planet pin and input planet carrier.
Figure 3C:
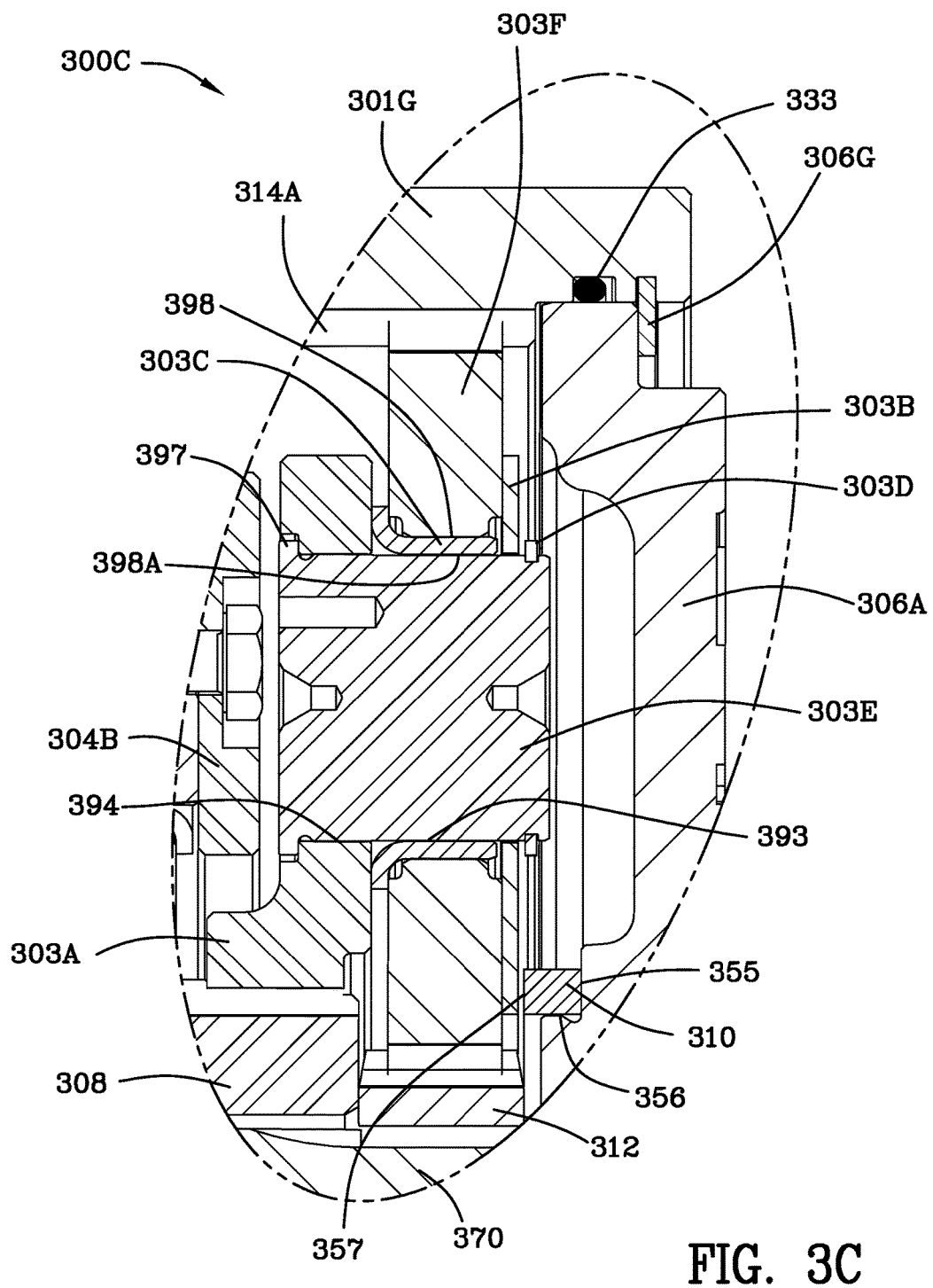
FIG. 3C is an enlarged portion of FIG. 3A illustrating the intermediate planet gear.
Figure 3D:
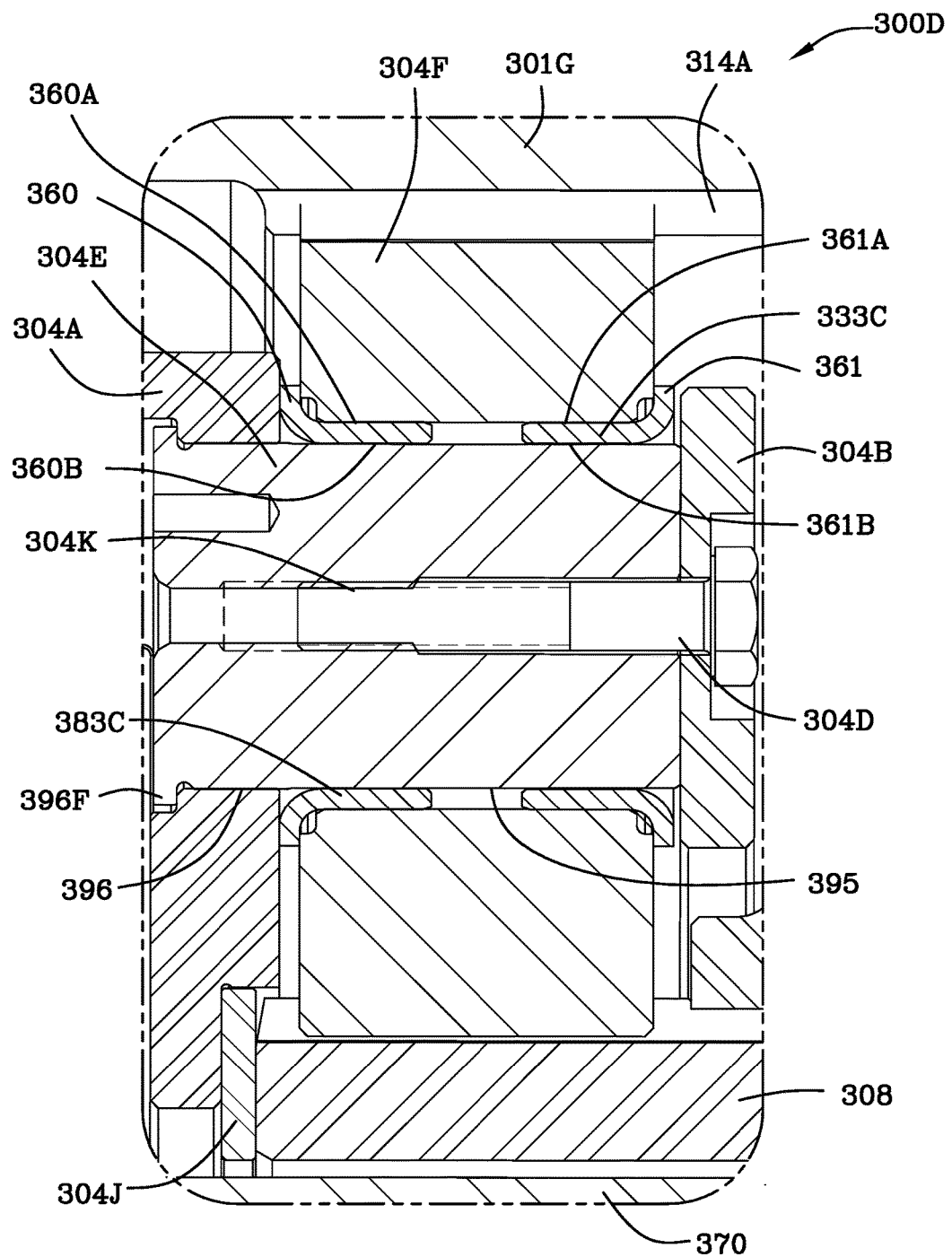
FIG. 3D is an enlarged portion of FIG. 3A illustrating the output sun gear, the output planet gear 304A, and the output ring gear.
Figure 3E:
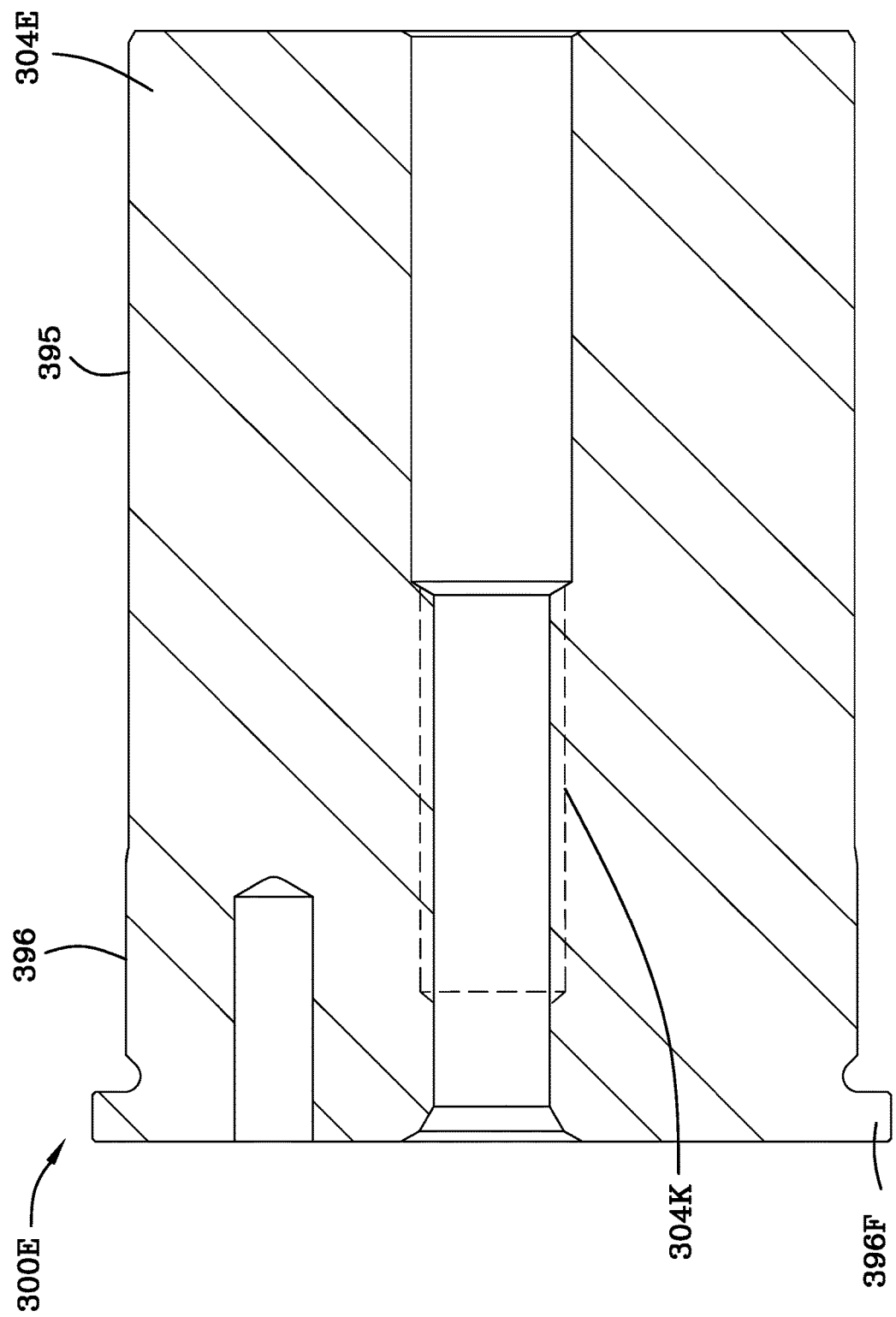
FIG. 3E is an enlarged view of the output planet pin.
Figure 3G:
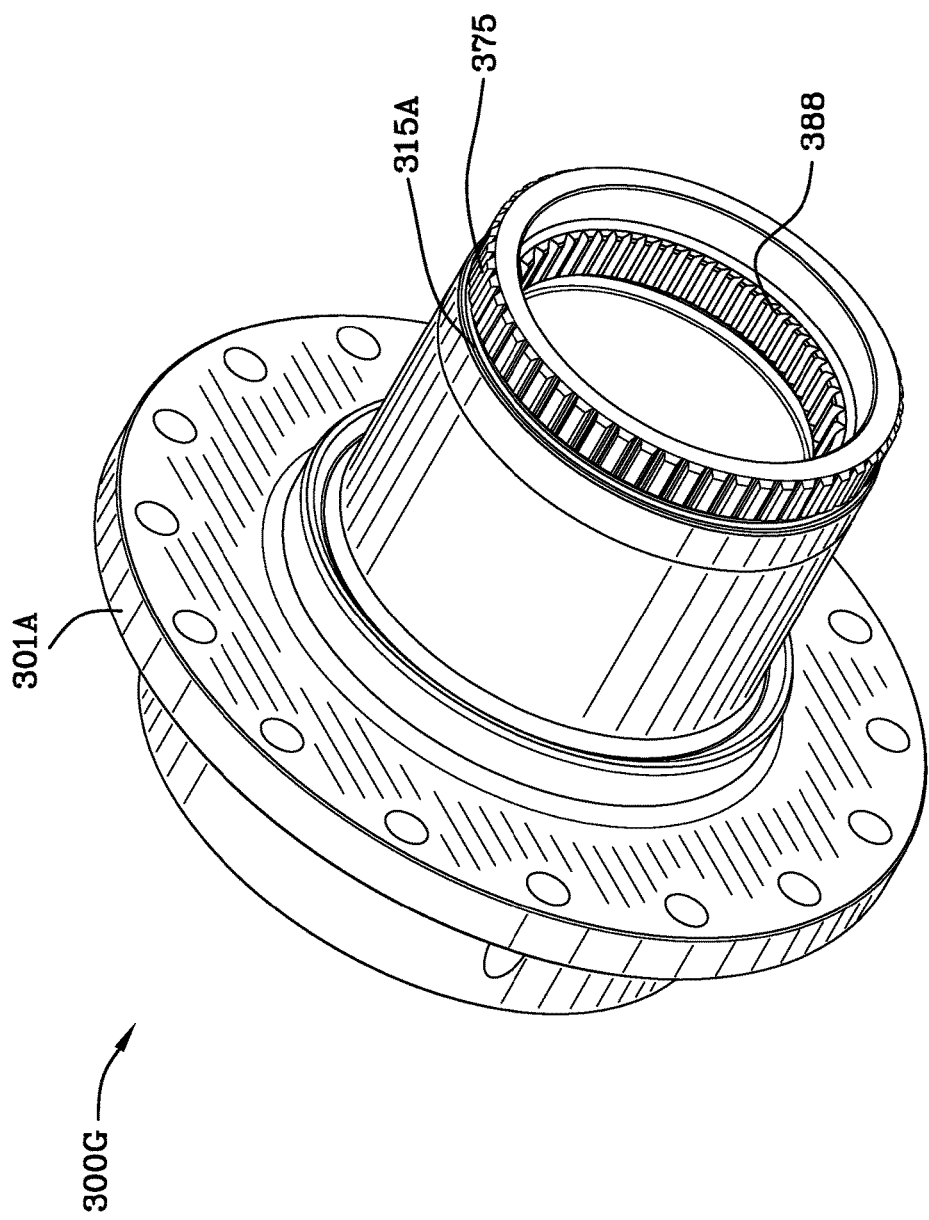
FIG. 3G is a perspective view of the stationary spindle illustrating the external spline for mating with the internal spline of the output planet carrier and the external threads for mating with the internal threads of the bearing nut.

FIGS. 3-3G set forth the third example of the invention. FIGS. 3-3G illustrate a triple planetary wheel drive. Some of the structural arrangements in the third example of the invention are similar to the first and second examples of the invention. Therefore, to avoid duplication and unnecessary repetition in the specification, description of structure and function common to FIGS. 1-1H, 2-2E and 3-3G is in most instances not repeated in regard to FIGS. 3-3G and the description of the common structure and function of FIGS. 3-3G is equally applicable to the other example that is not described with as much detail and specificity.

FIGS. 1-1J set forth the first example of the invention and illustrate 3 output planet gears and 1 input planet gear for schematic purposes in disclosing the invention. There may be up to 4 output planet gears and 3 input planet gears.

FIGS. 2-2E set forth the second example of the invention and illustrate 1 output planet gear and 1 input planet gear. There may be up to 3 output planet gears and 3 input planet gears.

FIGS. 3-3G set forth the third example of the invention and illustrate 4 output planet gears, 1 intermediate planet gear and 1 input planet gear. There may be up to 4 output planet gears, 3 intermediate planet gears and 3 input planet gears.

FIG. 1 is an end view 100 of a planetary wheel drive 199 shown in FIG. 1J. FIG. 1A is another end view 100A of the planetary wheel drive 199 shown in FIG. 1J. FIG. 1J is a perspective view 100J of the planetary wheel drive 199. Bolts 110M secure the wheel of the vehicle therearound for propulsion of the vehicle. End plate 106A bears a nameplate 118 fastened 119 thereto. Pipe plugs 111 are illustrated in the cover which can supply lubricating fluid as needed.

FIG. 1B is a cross-sectional view 100B of the planetary wheel 199 drive taken along the lines 1B-1B of FIG. 1. Bolts 106C affix a disengage cap 106B to the end plate 106A. Sometimes herein the end plate is referred to as a cover. Plastic hydraulic plug 130 and pressure plug 131 are illustrated in the end view of FIG. 1A.

Still referring to FIG. 1B, stationary spindles 101A is illustrated and it is secured by unnumbered bolt holes to a vehicle such as an aerial work platform (not shown). Rotatable housing 101G is mounted to the spindles using bearings 101D, 101D. Lubricating oil resides within the housing 101G which is not illustrated for clarity. Cover plate 106A is secured to housing by retaining ring 106G and o-ring seal 133 maintains the lubricating oil within the housing. Seal 101B retains lubricating oil within the housing as well.

Still referring to FIG. 1B, rotatable housing 101G includes an internal ring gear 114A. The internal ring gear 114A of the example illustrated in FIGS. 1-1J is substantially similar to the internal ring gears 214A and 314A illustrated in the planetary wheel drives examples set forth in FIGS. 2-2E and FIGS. 3-3G, respectively. Still referring to FIG. 1B, the internal ring gear 114A is in meshing engagement with the input planet gear 103F and the output planet gears 104F.

Still referring to FIG. 1B, and also referring to FIGS. 1C and 1I, stationary spindle 101A includes an external spline 183 which mates with internal spline 182 of a single walled output planet carrier 104A. FIG. 1C is a cross-sectional view 100C of the planetary wheel drive taken along the lines 1C-1C of FIG. 1A. FIG. 1I is an enlargement 100I of a portion of FIG. 1C illustrating the brake arrangement.

FIG. 1C enables viewing of the passageway 198 which supplies hydraulic fluid/hydraulic pressure to chamber 198C to release the brake whereas FIG. 1B does not illustrate the passageway and chamber. Mating of the external spline 183 of the stationary spindle and the internal spline 182 of the output planet carrier prevents rotation of the output planet carrier 104A. However, a small amount of axial movement is still permitted by the arrangement.

Bearing nut 101E includes internal threads 181 which mate with external threads 115A of the spindle 101A. Bearing nut 101E further includes a notch 183N into which a locking lug 186 of the output planet carrier 104A resides. Reference is made to FIGS. 1B, 2B and 2D to view the arrangement 200B of the locking lug 286 and the notch 283N. FIGS. 2B and 2D are from another example of the planetary wheel drive. FIG. 2B illustrates the single walled output planet carrier 204A and the locking lug 286 extending therefrom. Notch 283N exists in bearing nut 201E. Similarly notch 183N exists in bearing nut 101E and locking lug 186 fits therein to prevent rotation of the bearing nut. Referring to FIGS. 2B and 2D, bearing nut 201E is threaded to the spindle but is prevented from backing off of the spindle as the locking lug prevents same since it is not rotatable as the output planet carrier 204A is tied to the stationary spindle. In the example of FIGS. 1-1J, bearing nut 101E assists in securing bearings 101D in place. In the example of FIGS. 2-2E, bearing nut 201E assists in securing washer 201C in place against flange 272 of the second main bushing 211D.

Referring to FIG. 1B, the planetary wheel drive 199 includes a stationary spindle 101A and a rotatable output housing 101G. An input shaft 107 drives an input stage and the input stage drives the output stage. The input stage includes an input sun gear 112 splined to (or integral with) input shaft 107. Input sun gear 112 drives input planet gear 103F. Input planet gear 103F meshes with internal ring gear 114A of the rotatable output housing. Input planet pin 103E is press fit into an input carrier 103A which uses an internal spline 140A to drive output sun gear 108. Output sun gear 108 drives output planet gear 104F. Output planet gear 104F meshes with internal ring gear 114A of the rotatable output housing 101G. Output planet pin 104E is press fit into output planet carrier 104A.

The output stage includes a single wall output planet carrier 104A fixed against rotation by stationary spindle 101A. The single wall output planet carrier 104A includes an internal spline 182. The stationary spindle 101A includes an external spline 183. The internal spline 182 of the single wall output planet carrier 104A slidingly mates with said external spline 183 of the stationary spindle securing the single wall output planet carrier 104A against rotation but permitting axial movement between the output planet carrier and said stationary spindle.

The single wall output planet carrier 104A includes a locking lug 186. The stationary spindle includes exterior threads 115A extending circumferentially therearound. Internal threads 181 of the bearing nut mate with the exterior threads extending circumferentially around the stationary spindle securing the internal threads of the bearing nut thus securing the bearing nut to the spindle. See FIG. 1I. The bearing nut includes a notch 183N therein. See FIG. 1B. The notch 183N of the bearing receives the locking lug 186 of the single wall output planet carrier preventing rotation of the single wall output planet carrier with respect to the bearing nut and preventing the bearing nut from disengaging the stationary spindle wherein the locking lug retains the bearing nut in place preventing the bearing nut from backing off the stationary spindle. There may be a plurality of notches in the bearing nut enabling rotational adjustment of the locking lug of the single wall output planet carrier 104A with respect to the bearing nut 101E.

The output stage includes an output planet pin 104E. The single wall output planet pin 104E includes a hole therein to receive the output planet pin therein. The hole of the output planet carrier 104A interrupts the internal spline of the output planet carrier creating a discontinuity of the internal spline. FIG. 2D is a perspective view 200D of the fixed output planet carrier 204A illustrating the internal spline 282 and the bearing nut 201E. The holes 284 in the single wall may receive a planet pin pressed therein. The hole 285 in the single walled output carrier of the second example provides space for the input coupling 209 and the input shaft 207. Internal spline 282 mates with external spline 282A of the spindle 201A.

The output planet pin 104E includes a flanged head which is unnumbered in FIGS. 1B and 1C. The output planet pin 104E is pressed into the hole (unnumbered) in the single wall output planet carrier 104A.

Figure 2C:
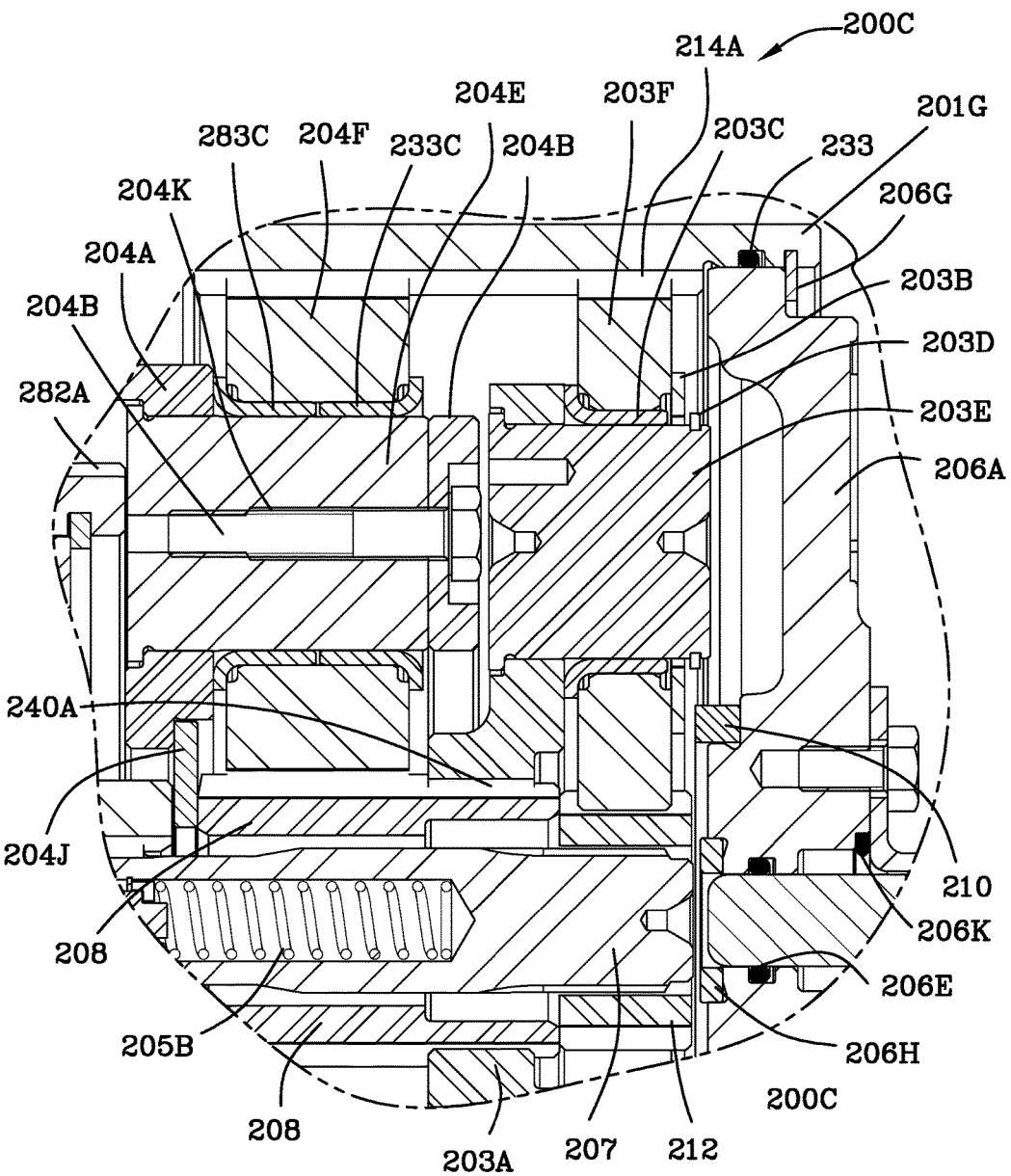
FIG. 2C is an enlarged portion of FIG. 2A illustrating the planet gears of the input stage and the output stage, and, planet bearings between the planet gears and respective planet pins.
Figure 2D:
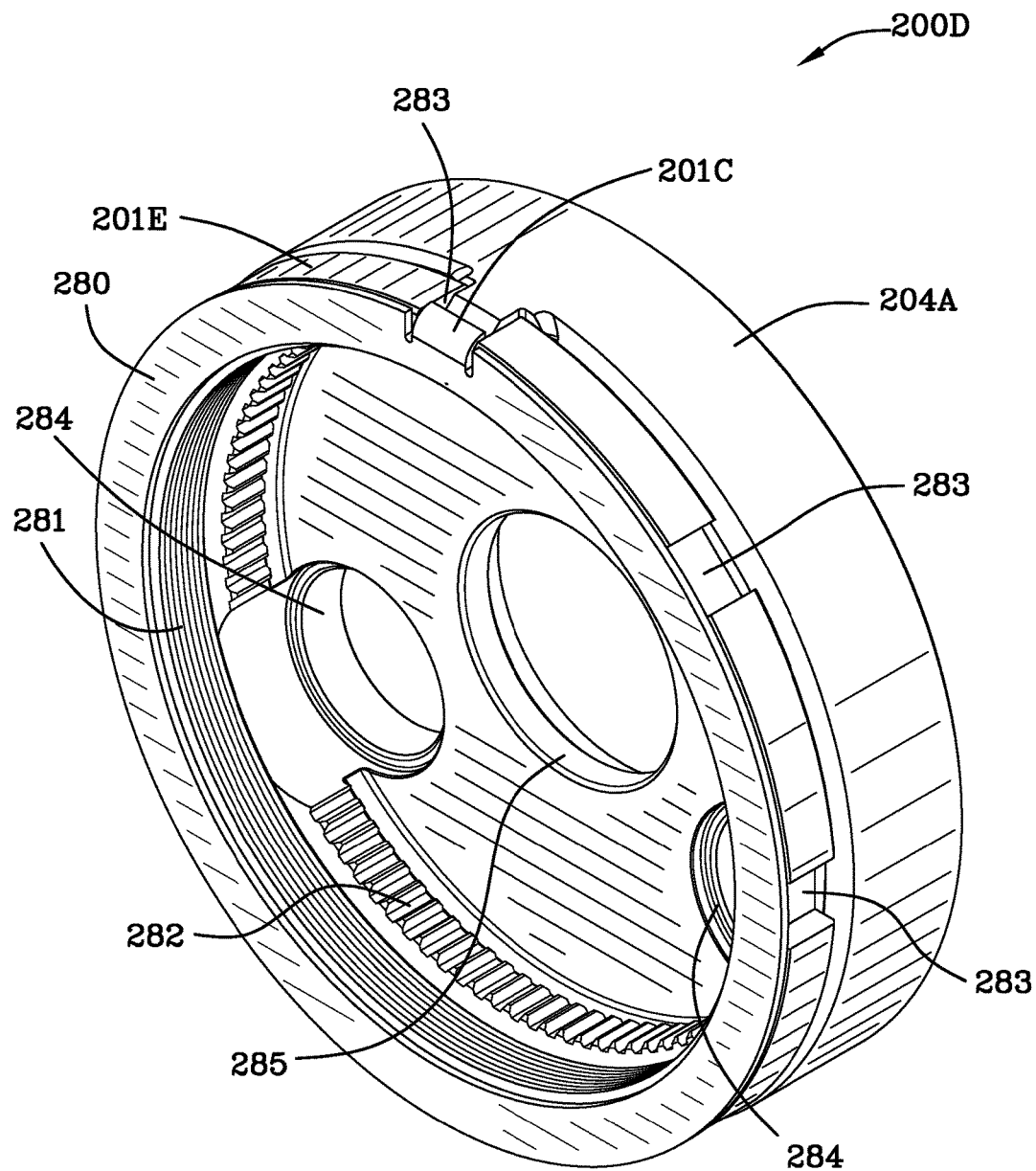
FIG. 2D is a perspective view of the fixed output carrier illustrating the internal spline and the bearing nut.

Reference is made to FIGS. 1B, 1C, 2C, 2D, 3D, 3E and 3F. FIG. 2C is an enlarged portion 200C of FIG. 2A illustrating the planet gears of the input stage and the output stage, and, planet bearings between the planet gears and respective planet pins of the second example of the planetary wheel drive. FIG. 2 is an end view 200 of the second example of a planetary wheel drive 299. FIG. 2A is a cross-sectional view 200A taken along the lines 2A-2A of FIG. 2. FIG. 2D is a perspective view 200D of the fixed output carrier illustrating the internal spline and the bearing nut of the second example of the planetary wheel drive. FIG. 3D is an enlarged portion 300D of FIG. 3A illustrating the output sun gear 308, the output planet gear 304F, and the output ring gear 314A of the third example of the planetary wheel drive. FIG. 3E is an enlarged view of the output planet pin 304E of the third example of the planetary wheel drive 399. FIG. 3F is an enlarged portion 300F of FIG. 3B illustrating the input planet pin 380 of the third example of the planetary wheel drive.

As used herein, an "interrupted" output planetary carrier means that the internal spline of the carrier is discontinuous as holes for the planet pin are cut therein. See FIG. 2D.

Referring to FIG. 3D, the output planet pin 304E includes a flange 396F and surfaces 396 and 395. Surface 396 represents a larger diameter than surface 395. Surface 396 is pressed into one of the holes of the output carrier 304A until flange 396F abuts the carrier 304A. In FIG. 2D hole 284 is illustrated in the wall of the output carrier 204A. Referring to FIG. 3E, an unnumbered relief is illustrated near the flange on the pin to accommodate the press fit process.

In FIGS. 1B and 1C, the unnumbered flange is pressed into output carrier 103A. Where the term "output carrier" is used herein it means single walled output planet carrier.

Still referring to FIG. 3D, an output planet thrust plate 304B is shown. Bolt 304D is illustrated securing thrust plate 304B to the threaded bore of the output planet carrier pin 304E adding strength and stiffness to the output carrier 304A. In FIGS. 1B and 1C, see output planet carrier pin 104E, thrust plate 104B and bolt 104D. in FIG. 2C, see output planet carrier 204A, thrust plate 204B and bolt 204D.

The planetary wheel drive of all the examples, to wit, the first example FIGS. 1-1H, the second example FIGS. 2-2E, and the third example FIGS. 3-3G, include a single walled output planet carrier 104A, 204A, 304A having an output planet thrust plate 104B, 204B, 304B. The output planet thrust plate 304B includes a bore therethrough. The output planet thrust plate 304B includes a counterbore concentric with the bore through the output planet thrust plate 304B. The bore through the output planet pin is threaded as indicated by reference numeral 304K. The bolt 304D includes threads thereon. See FIGS. 1B, 1C and 2C as well for corresponding structure.

The bolt 304D threadedly interconnects with the threaded bore of the output planet pin 304E interconnecting the output planet thrust plate 304B to the output planet pin 304E securing the output planet pin to the single wall output planet carrier 304A adding single wall output planet carrier strength and stiffness to the single wall output planet carrier 304A.

The output planet thrust plate 104B, 204B, 304B interengages the input stage limiting axial movement of the single wall output planet carrier 104A, 204A, 304A with respect to the stationary spindle 301A and preventing axial retraction of the locking lug of the single wall output planet carrier from the notch of the bearing nut.

The thrust plate 304B is not an integral part of the single walled output planet carrier as it is for a normal double wall carrier. Thrust plate 304B functions as a stiffener for the planet pins to reduce deflection but makes manufacturing considerably easier on the single walled output planet carrier.

See FIGS. 1B and 1C illustrating the single wall output planet carrier 104A, output planet thrust plate 104B, bolt 104D and threading 104K. See FIGS. 2A and 2D illustrating the single wall output carrier 204A, output planet thrust plate 204B, bolt 204D and threading 204K.

Referring to FIG. 2D illustrating the single wall output planet carrier 304A, holes 284 are illustrated interrupting the internal spline 282 of the carrier 304A, internal threads 281 of the bearing nut 201E, a central hole 285 providing room for the drive shaft 207, a plurality of notches 283N for receiving the locking lug 286 extending from the carrier 204A. Also illustrated is the washer 280 which resides adjacent one of the flanges of the bushing. Washer 280 is used in conjunction with the second example illustrated in FIGS. 2-2E which employ main bushings 201D and 211D as is best illustrated in FIGS. 2 and 2A. A washer is not used in connection with the third example of the invention which uses bearings 101D, 101D. A washer is not used in connection with the first example of the invention which uses bearings 301D, 301D.

Referring to FIG. 2D, a single wall output planet carrier 204A is disclosed as previously stated and is generally cylindrically shaped. Single wall output planet carrier 204A includes a partially closed single wall (unnumbered) at one end thereof and a cylinder wall (unnumbered) extending from the partially closed single wall. Locking lug 286 is integral with the planet carrier 204A and, when installed, is aligned with one of the plurality of notches 283N of the bearing nut. Notches 283N are arranged circumferentially about the bearing nut 201E. See FIG. 1B of the first example of the invention which illustrates a bearing nut 101E with a notch 183N therein and a locking lug 186. Note that FIG. 1C does not illustrate these features due to the section 1C-1C being different than the section 1B-1B. Note that FIG. 3A of the third example of the invention does illustrate the lug and notch in this cross-sectional view. The lug and notch feature is present in the third example of the invention and their structure and function is the same as that described in connection with the second example, in particular, as best shown in FIG. 2D.

Referring to FIGS. 3A and 3G, the stationary spindle includes external spline 375 which mates with an internal spline of the single walled output planet carrier 304A. The internal spline of carrier 304A is not illustrated but its structure and orientation are similar to the internal spline 282 of the single walled output planet carrier 204A illustrated in FIG. 2D.

The single wall output carrier offers high performance with low cost by having carrier strength and stiffness required to perform. Locking lugs keep the bearing nut retention from backing off and allow for easy disassembly of the planetary wheel drive for service. The output carrier thrust plate adds stiffness to the assembly under load and acts as a thrust plate. Additionally, the single wall carrier design allows for short overall length.

Referring to FIG. 1B, the planet pin 104E has a flanged head and is pressed into single walled output carrier 104A. The single walled output carrier 104A reacts output torque from the stationary spindle 101A to the ring gear 101G through the internal spline 182 of the output carrier. Output carrier 104A geometry is such that the output planet pin 104E holes interrupt the carrier internal spline. Carrier 104A acts as an axial thrust surface for planet bushing 183C. Output thrust plate 104B acts to increase carrier stiffness and act as axial thrust plate for planet bushing 133C. See FIG. 1B. Bolt 104D engages output planet pin 104E and clamps thrust plate 104B to planet pin 104E. Thrust washer 104J functions as a thrust surface and stackup element for the input coupling 109 and output sun gear 108.

Couplings 109, 209 receive input power from a prime mover which is not illustrated. Coupling 109, 209 includes an internal spline which mates with the prime mover and transfers the rotational input into rotation of the input shaft 107, 207 through an interconnection with the coupling 109, 209.

Once the output thrust plate 104B is bolted to the planet pins 104D that are pressed into the single walled output planet carrier 104A, the thrust plate 104B rotates with the single walled output planet carrier. The output thrust plate 104B provides stiffness for the output planet pins to minimize deflections under load. It also functions as a thrust surface for the bushing 133C inside the planet gear, whereas normally, the planet gear would thrust against a separate thrust washer that would be locked into the carrier to prevent rotation, using a tang or button that fits into a slot in the carrier. These are not required with the instant invention.

Referring to FIGS. 2A and 2C, output thrust plate 204B, output planet pin 204E, and bolt 204B are well illustrated. Thrust plate 204B is a plate that extends circumferentially within output housing 204G and is illustrated in position to engage bushing 203C.

Referring to FIGS. 3A and 3D, output thrust plate 304B, output planet pin 304E, and bolt 304B are well illustrated. Thrust plate 204B is a plate that extends circumferentially within output housing 204G and is illustrated in position to engage bushing 203C.

Planet gears in planetary speed reducers require the use of some bearing to ensure the effective life of the system. Planetary wheel drives typically utilize full compliment needle roller bearings, tapered roller bearings, or cylindrical roller bearings eliminate metal to metal contact of the planet gear bore and the planet shaft. Roller bearings use rolling elements to eliminate surface damage and provide efficiency while in operation and transferring power.

Referring to FIGS. 1B, 1C, 2B, 2A, 2C, 3A, 3C, and 3D bushings are used between rotating components and fixed components. Bushings do not have rolling elements but have proprietary coatings that allow them to run directly on the shaft.

Referring to FIG. 2C, bushing 203C is pressed into the bore of input planet gear 203F and relative motion is between the bushing 203C and the planet pin 203E. The bushing 203C has a flange that when pressed into the planet gear reacts to input carrier relative motion tangential loads, but, also reacts to axial load on the planet gear 203F. The flange of the bushing also separates the planet gear 203F from the planetary carrier 203A providing adequate life. Input planet gear 203F rotates relative to input planet pin 203E. Further, planet gear 203F is driven by input planet sun 212. Planet gear 203F meshes with output ring gear 214A. Thrust plate 203B together with retaining ring 203 and thrust washer 210 absorb axial loads imparted to the input gear 203F.

Because the bushing 203C is pressed into the input planet gear 203F and rotates with the gear, the surface finish in the bore of the gear 203F does not need to be ground but can be turned to size and finish. This reduces an operation for the planet gear reducing cost. The tolerance is not as exacting as it would be for a roller bearing so the tolerance and required surface finish do not need to be as good. Because the OD to ID cross section is small, it does provide some benefit to reducing the cross-section required to house the bushing versus a roller bearing. Roller bearings reduce the amount of backing on the gear teeth of the planet gear making for a weaker part. In other words, the roller bearings take up more radial space reducing the volume of metal in the gear itself. Bushings allow the use of stronger planet gears in less space. Bushings also tend to require less lubrication than a roller bearing would to function properly.

In regard to the first example, to wit, FIGS. 1-1H, and the second example, to wit, FIGS. 2-2E, the planetary wheel drive includes a stationary spindle and a rotatable housing. Specifically, in regard to FIGS. 2-2E, the wheel drive includes an input stage and an output stage. The input stage includes an input sun gear 212 splined to the input shaft 207 (or, alternatively, gearing or a spline in the input shaft), an input planet gear 203F, an input planet pin 203E and an input planet carrier 203A. The input planet pin has a first portion and the first portion has a first diameter. The input planet pin has a second portion and the second portion has a second diameter. The first diameter of the input planet pin 203E is larger than the second diameter of the input planet pin 203E. See FIG. 1B.

The first portion of the input planet pin 203E is preferably press fit into a respective bore of the input planet carrier 203A. Other methods of affixation may be used. The input planet gear 203F includes a bore. The bore of the input planet gear 203F is turned to size and finished but not ground.

An input planet bushing 203C includes a flange. The flange of the input planet bushing separates the input planet gear 203F from the input planet carrier 203A.

The input planet bushing includes a cylindrical portion and a flanged portion. The input planet bushing includes a first side and a second side and the first side is made of steel. The input planet bushing 203C includes a second side made of a steel backing and a first sliding layer. The first side of the input planet bushing 203C, the metal side, is affixed to the bore of the input planet gear by press-fitting same within the bore of the input planet gear 203F.

The second side of the input planet bushing, the first sliding layer, is rotatable about the input planet pin. The rotatable housing 201G includes an internal ring gear 214A and the input planet gear 203F meshes with the internal ring gear 214A of the rotatable housing. The input planet carrier 203A includes an internal spline (unnumbered) which drives the sun gear 208 of the output planet stage. See FIG. 2C.

The first sliding layer of the input planet bushing 203C is impregnated with a lubricating agent which may be PTFE.

Still referring to FIG. 2C, the output stage includes an output sun gear 203, an output planet gear 204F, an output planet pin 204E and an output planet carrier 204A. The output planet pin has a first portion having a first diameter and a second portion having a second diameter.

Reference is made to FIG. 3E, an enlarged view of the output planet pin, as better detail of output planet pins is shown. The first diameter 396 of the output planet pin 304E is larger than the second diameter of the output planet pin. The first portion of the output planet pin is press fit into a respective bore of the output planet carrier. The bore of the output planet gear is turned to size and finished but not ground. See FIG. 2D for a good view of bores 284 in the single walled output carrier.

Referring to FIG. 2C, the output planet gear 204F includes a bore. A first output planet bushing 283C and a second output planet bushing 233C are shown. The first output planet bushing 283C includes a flange and the second output planet bushing 233C includes a flange. The flange of the first output planet bushing 283C separates the output planet gear 204F from the output planet carrier 204A.

Each of the first and second output planet bushings includes a first side and a second side. Each of the output planet bushings includes a first side made of steel and a second side made of a steel backing and a first sliding layer.

Each of the first sides of the output planet bushings 283C, 233C is affixed to a bore of the output planet gear. Each of the second sides of the output planet bushings 283C, 233C is rotatable about the output planet pin 204E. The output planet gear 204F meshes with the internal ring gear of the rotatable housing 201G. Each of the first sides of the output planet bushings is preferably press fit into the bore of the output planet gear. However, other methods of affixation may be used.

Each of the first sliding layers of the output planet bushings are impregnated with a lubricating agent which may be PTFE.

Referring to FIG. 3D, bushings 383C, 333C are illustrated. Flanges 360, 361 of the bushings 383C, 333C are shown along with the first side 360A of bushing 383C, the second side 360B of bushing 383C, the first side 361A of the bushing 333C, and the second side 361B of bushing 333C are illustrated in FIG. 3D. The same description provided in connection with the output planet pins, bushings, and planet gears in connection with the second example of FIGS. 2-2E is applicable to FIG. 3D of the third example.

Referring to FIGS. 2-2E, and in particular, FIG. 2B, a planetary wheel drive includes a stationary spindle 201A and a rotatable output housing 201G. A first main bushing 201D is interposed between the stationary spindle and the rotatable output housing. A second main bushing 211D is interposed between the stationary spindle and the rotatable output housing 201G. The first main bushing 201D includes a first flange 271 and the second main bushing 211D includes a second flange 272. The first main bushing and the second main bushings are affixed to the rotatable housing 201G.

The first main bushing 201D includes a first side 275 made of steel. The first main bushing includes a second side 276 made of a steel backing and a sliding layer of PTFE, Polytetrafluoroethylene. The second main bushing 211D includes a first side 277 made of steel and the second main bushing 211D includes a second side made 278 of a steel backing and a sliding layer of PTFE, Polytetrafluoroethylene.

The stationary spindle 201A includes an exterior surface and an exterior shoulder 270 in the exterior surface. The rotatable housing includes an internal surface and the internal surface of the rotatable housing includes a first shoulder 273 and a second shoulder 274. See FIG. 2E, a cross-sectional view of rotatable housing 201G. FIG. 2E is a cross-sectional view 200E of the rotatable output housing.

The first flange 271 of the first main bushing 201D is affixed to the rotatable housing abuts the first shoulder 273 of the internal surface of the rotatable housing 201G. The first flange of the first main bushing is affixed to the rotatable housing and abuts the exterior shoulder 270 of the spindle 201A. The second flange 272 of the second main bushing 211D is affixed to the rotatable housing 201G abuts the second shoulder 274 of the internal surface of the rotatable housing 201G. A retaining nut 201E for securing the stationary spindle 201A and the rotatable housing 201G against axial separation.

The first main bushing 201D and the second main bushing 211D are preferably press-fit onto the rotatable housing 201G. Other methods of affixation are specifically contemplated.

The first main bushing 201D includes a second side 276 made of a steel backing and a first sliding layer of PTFE, Polytetrafluoroethylene. The second main bushing 211D includes a second side 278 made of a steel backing and a second sliding layer of PTFE, Polytetrafluoroethylene. The first sliding layer and the second sliding layer slidingly engage the stationary spindle.

Referring to FIGS. 3-3G, a planetary wheel drive includes a stationary spindle 301A and a rotatable output housing 301G. The stationary spindle includes an internal ring gear 314A as best illustrated in FIG. 3D. FIG. 3 is an end view 300 of the third example of the planetary wheel drive 399.

The housing includes an internal ring gear 314A, an input stage proximate the brake and residing within the spindle 301A, an intermediate stage proximate the cover 306A and an output stage.

FIG. 3A is a cross-sectional view 300A of the third example of the planetary wheel drive 399 taken along the lines 3A-3A of FIG. 3. FIG. 3B is an enlarged portion 300B of FIG. 3A illustrating the input sun 381, input planet gear 387, input planet pin 380 and input planet carrier 390, 370.

Referring to FIG. 3B, the input stage includes an input sun gear 381, an input planet gear 387, an input planet pin 380 and an input planet carrier having portions 390, 370. The input sun gear 387 and the input planet gear 387 reside within the spindle 301A. The input planet gear 387 is in meshing engagement with the internal ring gear 388 of the stationary spindle 301A. The input planet carrier mounted on the input planet pin 380 in that the planet pin is press fit into a hole of the input planet carrier 390, 370. See also FIG. 3G for a perspective view of the spindle.

The input planet carrier 390, 370 is cantilevered and extends axially outside of the stationary spindle 301A. The input planet carrier drives the intermediate stage and the intermediate stage drives the output stage, and, the output stage includes an output carrier 304A and the output carrier is fixed to the stationary spindle. FIG. 3C is an enlarged portion 300C of FIG. 3A illustrating the intermediate planet gear. FIG. 3D is an enlarged portion 300D of FIG. 3A illustrating the output sun gear 308, the output planet gear 304A, and the output ring gear 314A.

The cantilevered planet carrier includes an end portion 370 having an external spline thereon used to drive intermediate sun 312. The intermediate stage includes an intermediate sun gear 312, an intermediate planet gear 303F, an intermediate planet pin 303E and an intermediate planet carrier 303A. Intermediate sun gear 312 includes an internal spline mating with the external spline of the cantilevered planet carrier.

Referring to FIG. 3B, reference numerals 390, 370 signify the input carrier. Thrust plate 371 is supported by retaining rings 372, 371 and together with bushing 389, supports the input planet gear 387. Thrust washer 373 and input carrier 390 pressed into engagement with pin 380 support, also support the high speed input planet gear 387. Input sun gear 381 drives input planet gear 387. Input sun gear 381 includes an internal spline 386 connected to external spline 384 of shaft 307.

The intermediate sun gear 312 in meshing engagement with the intermediate planet gear 303F. The intermediate planet carrier 303A is fixed to the intermediate planet pin 303E as illustrated in FIG. 3C. The intermediate planet carrier 303A includes an internal spline. The output stage includes an output sun gear 308, an output planet gear 304F, an output planet pin 304E and an output carrier 304A. The output sun gear 370 includes an external spline mating with the internal spline of the intermediate planet carrier. The output sun gear 308 is in meshing engagement with the output planet gear 304F.

The external spline of the cantilevered planet carrier 370 drives the intermediate sun gear 312 The intermediate planet gear 303 is in meshing engagement with the internal ring gear 314A of the rotatable housing 301G. The output planet gear 304F is in meshing engagement with the internal ring gear 314A of the rotatable housing 301G. The input sun gear 381 and the input planet pin 380 of the input stage are located between the brake and the output stage.

Referring to FIGS. 3A and 3B, a generally cylindrical sleeve 382 is driven by a prime mover not shown. Sleeve 382/coupling 309 in turn drive input shaft 307. Shaft 307 has an external spline 384 and input sun 381 has a mating internal spline 386. The input planet carrier includes a first portion 390 within the spindle 301A and an elongated cylindrical portion 370. The elongated cylindrically shaped portion 370 of the input planet carrier surrounds the input shaft 307 and extends toward the cover 306A.

FIG. 3E is an enlarged view 300E of the output planet pin 304E illustrated in FIG. 3D. Referring to FIG. 3D, the output planet pin includes a flange 396F and surfaces 396 and 395. Surface 396 represents a larger diameter than surface 395. Surface 396 is pressed into one of the holes of the output carrier 304A until flange 396F abuts the carrier 304A. In FIG. 2D hole 284 is illustrated in the wall of the output carrier 204A. An unnumbered relief is illustrated near the flange on the pin to accommodate the press fit process.

Still referring to FIG. 3D, an output planet thrust plate 304B is shown. Bolt 304D is illustrated securing thrust plate 304B to the threaded bore of the output planet carrier pin 304E adding strength and stiffness to the output carrier 304A. In FIGS. 1B and 1C, see output planet carrier pin 104E, thrust plate 104B and bolt 104D.

FIG. 3F is an enlarged portion 300F of FIG. 3B illustrating the input planet pin 380. An unnumbered relief is shown which accommodates the press fit into the fixed output carrier 304A. The output planet pin 304E has a larger diameter in the surface region 396 of the press-fit of the bushings 383C, 303C. Output planet pin 304E has a relatively smaller diameter in the surface regions 395 to accommodate rotation of the gear with bushings affixed thereto about the output pin 304E.

FIG. 3G is a perspective view 300G of the stationary spindle illustrating the external spline for mating with the internal threads of the output planet carrier and the external threads for mating with the internal threads of the bearing nut.

The triple planetary wheel drive of FIGS. 3-3G with a high speed input carrier 390, 370 and internal ring gear 388 integrated into the spindle between the spring applied hydraulic released parking brake and the fixed output carrier results in a compact triple planetary wheel drive.

By installing the high speed input carrier 390, 370 inside of the spindle diameter, the overall length of the planetary wheel drive is less than traditional three stage planetaries. This allows the use of the same internal ring gear 314A between double and triple planetary reductions.

The triple planetary wheel drive that has the high speed input carrier 390, 370 and internal ring gear 388 within the spindle enable higher ratios in the same output ring gear 314A as a double planetary.

The planetary wheel drives set forth in the first example, FIGS. 1-1J, the second example, FIGS. 2-2E, and the third example, FIGS. 3-3G include a first end and a second end. The first end mates with the prime mover to power the planetary wheel drive. The second end includes a cover 106A, 206A, 306A as illustrated respectively in FIGS. 1, 1J, 2 and 3. A high speed carrier thrust washer 110 is illustrated in the first example in FIGS. 1B and 1C, a high speed carrier thrust washer 210 is illustrated in the second example in FIGS. 2A and 2C, and an intermediate speed carrier thrust washer is illustrated in the third example in FIGS. 3A and 3C.

Referring to FIGS. 2C and 3C, as representative of the invention, the thrust washer 210, 310 is slip fit over the cover such that the combined surface area contact of the thrust washer and the cover 206A, 306A is larger than the contact surface area of the thrust washer with the thrust plate 203B, 303B.

The thrust plate 203B, 303B is interposed between the high speed planet gear 203F, 303F and the high speed carrier thrust washer 210, 310. The high speed planet gear rotates about the high speed carrier planet pin. The high speed planet pin 203E, 303E affixed to said high speed planet carrier 203A, 303A. In the example set forth in FIGS. 3-3G, the intermediate planet gear 303F is being described as the high speed gear and intermediate planet carrier 303A is being described as the high speed carrier. In the third example of the invention, FIGS. 3-3E, the input planet carrier 390, 370 is the highest speed carrier in the planetary system.

When the high speed carrier thrust washer engages the thrust plate, axial thrust from the planet carrier is absorbed by the thrust washer and the cover. The planet gear 203F, the thrust plate 203B and said thrust washer rotate at different relative speeds while the thrust washer 210 is fixed to the cover.

High speed carrier thrust is taken between planet gear 203F and cover 206A through thrust washer 210 and thrust plate 203B. Planet gear 203F, thrust plate 203B and thrust washer 210 all rotate at different relative speeds while thrust washer 210 is fixed to cover 206A. Thrust washer 210 is a slip fit on the cover 206A.

Preferably, the thrust washer 210 is slip fit on the cover 206A and the thrust plate 203B rotates with the planet carrier 203A.

Preferably, the thrust washer is a cylinder and has a rectangularly shaped in cross section wall. Other shapes and configurations of the thrust washer are specifically contemplated.

The planetary wheel drives set forth in the first example, FIGS. 1-1J, the second example, FIGS. 2-2E, and the third example, FIGS. 3-3G include a stationary spindle 101A, 201A, 301A and a stamped spring plate 101X, 201X, 301X. FIG. 1D is an enlargement 100D of a portion of FIG. 1B illustrating the brake arrangement. FIG. 1E is a perspective view 100E of the stamped brake plate 101X and pressure plate 1015 supporting the pressure plate. FIG. 1F is an end view 100F of the stamped brake plate 101X, pressure plate 1015 and coil springs 101R mechanically bonded to the stamped brake plate 101X.

FIG. 1G is a side view 100G of the stamped brake plate 101X, pressure plate 1015 and coil springs 101R. FIG. 1H is a perspective view 100H of the brake piston 101L with shoulder 101Z in the bore of the brake piston. Springs 101R reside in engagement with shoulder 101Z as illustrated in FIG. 1D. FIG. 1I is an enlargement 100I of a portion of FIG. 1C illustrating the brake arrangement and, in particular passageway 198 and chamber 198C which accommodate pressurized hydraulic fluid to release the brake. The brake arrangement is a spring applied hydraulically released brake meaning that pressurized hydraulic fluid is necessary to permit the transmission of motion through the planetary drive.

The stamped spring plate 101X includes a plurality of spring stabilizer connections 101Y and a corresponding plurality of coil springs 101R. Each one of the plurality of springs 101R is mechanically bonded to a respective one of the plurality of spring stabilizers 101Y. The brake piston 101L includes an unnumbered bore therethrough. The brake piston 101L is generally cylindrically shaped with an inner portion and an outer portion. The inner portion of the brake piston includes an inner shoulder 1012 therein. The brake piston resides in sliding engagement with the stationary spindle. Seals 101N, 101P prevent hydraulic fluid from escaping the chamber 198C. The plurality of coil springs 101R reside between the spring stabilizers 101Y and the inner shoulder 1012 of the brake piston 101L.

The pressure plate 1015 and the retainer 101T in the stationary spindle support and retain the plurality of springs between the stamped plate 101X and the brake piston 101L and within the stationary spindle 101A.

The brake arrangement further includes a rotatable drive coupling 109, a brake friction pack 101J, 101K, a friction pack thrust plate 120 secured in the stationary spindle 101A. The brake friction pack includes rotors 101K affixed to the rotatable drive coupling 109 and a stator 101j affixed to the stationary spindle.

The first end of the brake piston engages the stators 101J and forcibly compresses the stators into engagement with the rotors 101K and against the friction pack thrust plate 120 secured in the stationary spindle 101A.

The stationary spindle 101A includes a passageway 198 therein and the shoulder 101Z of the stationary spindle and the brake piston form a piston chamber 198C. The piston chamber is in fluidic communication with the passageway in the stationary spindle. Hydraulic fluid resides in the piston chamber and in the passageway in the stationary spindle. The brake friction pack is not in compression when the hydraulic fluid is pressurized and the coupling 109 is free to rotate. The brake friction pack is in compression when the hydraulic fluid is not pressurized and the coupling 109 is fixed to the stationary spindle. The mechanical bonding of the springs to the spring stabilizers is a process that wedges or swells the last coil of the spring over the spring stabilizers.

Typical spring applied hydraulically released brakes incorporate the use of individual springs located in spring pockets. The invention incorporates a brake piston 101L with a turned spring pocket diameter for the spring pack 101R. The spring pack is comprised of coil springs 101R that are mechanically bonded to the stamped single plate. Spring pack 101R reacts between the pressure plate 1015 and the brake piston 101L to compress the brake friction pack 101J and 101K into the thrust plate 120. The brake is released by hydraulic pressure that seals on the outer diameter of the brake piston 101L and is sealed by quad ring sealing elements 101N and 101P.

The planetary wheel drive further includes disconnect structure in the form of a disconnect pin 105A, 205A, 305A, spring 105B, 205B, 305B, thrust spacer 105C, 205C, 305C, a disengage cap 106B, 206B, 306B, disengage rod 106D, 206D, 306D, o-rings 106E, 206E, 306E, 106K, 206K, 306K and thrust washer 106H, 106J, 206H, 206J are not described herein in detail.

These and other reference numerals are included in this specification and their structure and function are discernible and understandable from the reference numerals listed hereinafter without further discussion of them.

REFERENCE NUMERALS 100 end view of a first example of a planetary wheel drive shown in FIG. 1J
100A another end view of a first example of a planetary wheel drive shown in FIG. 1J
100B cross-sectional view of a first example of a planetary wheel drive taken along the lines 1B-1B of FIG. 1
100C cross-sectional view of a first example of a planetary wheel drive taken along the lines 1C-1C of FIG. 1A
100D enlargement of a portion of FIG. 1B illustrating the brake arrangement
100E perspective view of the stamped brake plate and pressure plate
100F end view of the stamped brake plate, pressure plate and coil springs mechanically bonded to the stamped brake plate
100G side view of the stamped brake plate, pressure plate and coil springs
100H perspective view of the brake piston
100I enlargement of a portion of FIG. 1C illustrating the brake arrangement
100J perspective view of the first example of a planetary wheel drive
101A, 201A, 301A spindle, Steel (Thru Hardened)
101B, 201B, 301B lip seal
101D, 301D bearings
101E, 201E, 301E bearing nut
101G, 201G, 301G housing, Steel (Thru Hardened)
101J, 201J, 301J brake stator
101K, 201K, 301K brake rotor
101M, 201M, 301M stud
101N, 101P, 201N, 201P, 301N, 301P seal, quad
101L, 201L, 301L brake piston
101R, 201R, 301R spring
1015, 201S, 301S pressure plate
101T, 103D, 104D, 105D, 106G, 122 retaining ring
201T, 203D, 204D, 205D, 206G, 222 retaining ring
301T, 303D, 304D, 305D, 306G, 322 retaining ring
101X, 201X, 301X stamped spring plate
101Y, 201Y, 301Y spring stabilizer
1012, 201Z, 301Z spring wall of the brake piston 101L
103A, 203A, 303A carrier, Steel (Thru Hardened)
103B, 203B, 303B thrust plate
103C, 203C, 303C bushing
103E, 203E, 303E planet shaft/pin, Steel (Carburized)
103F, 203F, 303F planet gear, Steel (Carburized)
104A, 204A, 304A fixed output carrier, Steel (Thru Hardened)
104B, 2046, 304B retention plate
104D, 204D, 304D bolt, hex-unc
104E, 204E, 304E planet shaft, Steel (Carburized)
104F, 204F, 304F planet gear, Steel (Carburized)
104J, 204J, 304J washer
104K, 204K, 304K threaded interconnection of bolts 104D, 204D and 304D
105A, 205A, 305A disconnect/disengage pin
105B, 205B, 305B spring
105C, 205C, 305C thrust spacer
106A, 206A, 306A plate cover, Ductile Iron, Die Cast Aluminum
106B, 206B, 306B disengage cap
106C, 206C, 306C bolt, met-hex
106D, 206D, 306D disengage rod
106E, 206E, 306E o-ring
106H, 106J, 110, 206H, 206J, 210, thrust washer 306H, 306J, 310
106K, 206K, 306K o-ring
107, 207, 307 input shaft, Steel (Carburized)
108, 208, 308 sun gear, Steel (Carburized)
109, 209, 309 coupling
110, 210, 310 washer, thrust
111, 211, 311 pipe plug, o-ring
112, 212, 381 input sun gear
114A, 214A, 314A internal ring gear
115A, 215A, 315A external threads on stationary spindle
118, 218, 318 plate
119, 219, 319 rivet
120, 220, 320 friction pack thrust plate
130, 230, 330 plug, plastic
131, 231, 331 pressure plug
133, 233, 333 o-ring
133C, 183C bushing
140A, 240A, 340A internal spline
181 internal threads of bearing nut 101E
182 internal spline of fixed output carrier
183 external spine of stationary spindle
183N notches in threaded bearing nut 201E which receive a locking finger 186

198 passageway
198C chamber
199 first example of planetary wheel drive
200 end view of second example
200A cross-sectional view of second example taken along the lines 2A-2A of FIG. 2
200B enlargement of a portion of FIG. 2A illustrating the main bearings between the output housing and the spindle
200C enlarged portion of FIG. 2A illustrating the planet gears of the input stage and the output stage and planet bearings between the planet gears and respective planet pins
200D perspective view of the fixed output carrier
200E cross-sectional view of the rotatable output housing
201C washer
201D first main bushing between spindle 201A and housing 201G
211D second main bushing between spindle 201A and housing 201G
283C, 233C bushing
270 shoulder on the exterior of the spindle 201A
271 flange of first main bushing 201D
272 flange of second main bushing 211D
273, 274 shoulder of inner portion of housing 201G
275 first side (steel) of bushing 201D
276 second side (PTFE) of bushing 201D
277 first side (steel) of bushing 211D
278 second side (PTFE) of bushing 211D
280 washer with tab 201C
281 internal threads of bearing 201E
282 internal spline of fixed output carrier 204A
282A external spline of stationary spindle
283N notches in threaded bearing nut 201E which receive a locking finger 286
284 opening in fixed output carrier 204E for receiving planet pin (s) 204E
285 opening in output carrier 204A for coupling 209
286, 186 locking finger/locking lug
287 passageway for lubricating oil
299 second example of planetary wheel drive
300 end view of third example of the planetary wheel drive
300A cross-sectional view of the third example of the planetary wheel drive taken along the lines 3A-3A of FIG. 3
300B enlarged portion of FIG. 3A illustrating the input sun, input planet gear, input planet pin and input planet carrier.
300C enlarged portion of FIG. 3A illustrating the intermediate planet gear 303F
300D enlarged portion of FIG. 3A illustrating the input sun gear, the output planet gear 304A, and the output ring gear 314A
300E enlarged portion of FIG. 3A illustrating the input carrier 370 and the input pin
300F enlarged portion of FIG. 3B illustrating the pin 304E
300G perspective view of the stationary spindle illustrating the external spline for mating with the internal threads of the output planet carrier and the external threads for mating with the internal threads of the bearing nut
303C bushing
340A internal spline of intermediate carrier 203A
360 flange
361 flange
360A first side of bushing 383C
360B second side of bushing 383C
361A first side of bushing 333C
361B second side of bushing 333C
370 input carrier
371 thrust plate
372 retaining ring for thrust plate 371
373 thrust washer
380 input planet pin of third example
381 input sun gear of third example with internal spline 386 fixed to gear/spline 384 of shaft 307
382 generally cylindrical sleeve driven by prime mover (not shown)
383 internal spline of generally cylindrical sleeve 382 of third example
383C bushing
384 external spline of shaft 307 which mates with internal spline 383 of sleeve 382
386 internal spline of input sun 381
387 input planet gear
388 internal ring gear of spindle 301
389 flanged planet bushing
390 cantilevered input carrier
391 first cylindrical surface of pin 380
391F flange of input planet pin 380
392 second cylindrical surface of pin 380
393 first cylindrical surface of pin 303E
394 second cylindrical surface of pin 303E
395 first cylindrical surface of pin 304E
396 second cylindrical surface of pin 304E
396F flange of output planet pin 304E
397 flange on bushing 303C
398 first side of bushing 303C
398A second side (PTFE) of bushing 303C
399 third example of planetary wheel drive

The invention claimed is:

1. A planetary wheel drive, comprising:
a stationary spindle and a rotatable output housing;
said spindle includes an internal ring gear;
said housing includes an internal ring gear;
an input stage, an intermediate stage and an output stage;
said input stage includes an input sun gear, an input planet gear, an input planet pin and an input planet carrier;
said input sun gear and said input planet gear reside within said spindle;
said input planet gear in meshing engagement with said internal ring gear of said stationary spindle;
said input planet carrier mounted on said input planet pin;
said input planet carrier being cantilevered and extends axially outside of said stationary spindle;
said input planet carrier drives said intermediate stage;
said intermediate stage drives said output stage; and,
said output stage includes an output carrier and said output carrier is fixed to said stationary spindle.

2. The planetary wheel drive as claimed in claim 1, comprising:
said input cantilevered planet carrier includes an external spline;
said intermediate stage includes an intermediate sun gear, an intermediate planet gear, an intermediate planet pin and an intermediate planet carrier;
said intermediate sun gear includes an internal spline mating with said external spline of said cantilevered planet carrier;
said intermediate sun gear in meshing engagement with said intermediate planet gear;
said intermediate planet carrier is fixed to said intermediate planet pin;
said intermediate planet carrier includes an internal spline;
said output stage includes an output sun gear, an output planet gear, an output planet pin and said output carrier;

said output sun gear includes an external spline mating with said internal spline of said intermediate planet carrier;
said output sun gear in meshing engagement with said output planet gear;
said external spline of said cantilevered planet carrier drives said intermediate sun gear;
said intermediate planet gear in meshing engagement with said internal ring gear of said rotatable housing; and,
said output planet gear in meshing engagement with said internal ring gear of said rotatable housing.

3. The planetary wheel drive as claimed in claim 2, comprising:
a brake;
said input sun gear and said input planet pins of said input stage are located between said brake and said output stage.

4. The planetary wheel drive as claimed in claim 3, comprising:
an input shaft;
said input planet carrier includes a first portion within said spindle and an elongated cylindrical portion;
said elongated cylindrically shaped portion of said input planet carrier surrounds said input shaft and extends toward said second end.

5. The planetary wheel drive as claimed in claim 4, comprising:
main bearings reside between said spindle and said housing supporting said housing for rotatable movement of said housing about said spindle; and,
said internal ring gear in said spindle resides under said main bearings.

6. A planetary wheel drive, comprising:
a cylindrically shaped stationary spindle;
a cylindrically shaped rotatable housing;
a bearing interposed between said cylindrically shaped stationary spindle and said cylindrically shaped rotatable housing;
an input stage, an intermediate stage and an output stage;
said input stage includes an input sun gear, an input planet gear, an input planet carrier, and an input planet pin pressed into said input planet carrier;
said input planet carrier includes a first portion residing within said cylindrically shaped stationary spindle;
said input planet carrier includes a second, elongated portion residing outside said cylindrically shaped stationary spindle;
said elongated portion of said input planet carrier drives said intermediate stage; and,
said intermediate stage drives said output stage.

7. The planetary wheel drive as claimed in claim 6, further comprising:
said output stage includes a fixed output carrier.

8. The planetary wheel drive as claimed in claim 6, further comprising:
said input planet gears number in the range of 1 to 3.

9. The planetary wheel drive as claimed in claim 6, further comprising:
said intermediate stage includes intermediate planet gears;
said intermediate planet gears number in the range of 1 to 3.

10. The planetary wheel drive as claimed in claim 7, further comprising:
said output stage includes output planet gears;
said output planet gears number in the range of 1 to 4.

11. The planetary wheel drive as claimed in claim 6, further comprising:
said input planet gears number in the range of 1 to 3;
said intermediate stage includes intermediate planet gears;
said intermediate planet gears number in the range of 1 to 3;
said output stage includes output planet gears; and,
said output planet gears number in the range of 1 to 4.

12. The planetary wheel drive as claimed in claim 11, further comprising:
said rotatable housing includes an input ring gear;
said intermediate planet gears mesh with said input ring gear; and,
said output planet gears mesh with said input ring gear.

13. The planetary wheel drive as claimed in claim 12, further comprising:
said input sun gear is driven by an input shaft.

14. The planetary wheel drive as claimed in claim 12, further comprising:
said output stage includes a fixed output carrier.

15. The planetary wheel drive as claimed in claim 1, wherein said output carrier includes an internal spline and said stationary spindle includes an external spline, and said external spline is in meshing engagement with said internal spline of said output carrier fixing said output carrier to said stationary spindle.

16. The planetary wheel drive as claimed in claim 2, further comprising:
said output carrier includes an internal spline and said stationary spindle includes an external spline, and said external spline of said stationary spindle is in meshing engagement with said internal spline of said output carrier fixing said output carrier to said stationary spindle.

17. The planetary wheel drive as claimed in claim 6, further comprising:
an output carrier includes an internal spline and said stationary spindle includes an external spline, and said external spline of said stationary spindle is in meshing engagement with said internal spline of said output carrier fixing said output carrier to said stationary spindle.

18. A planetary wheel drive, comprising:
a stationary spindle and a rotatable output housing;
said spindle includes an internal ring gear;
an input stage, and at least one other stage driven by said input stage;
said input stage includes an input sun gear, an input planet gear, an input planet pin and an input planet carrier;
said input sun gear, said input planet gear and said input planet pin reside within said spindle;
said input planet gear in meshing engagement with said internal ring gear of said stationary spindle;
said input planet carrier mounted on said input planet pin;
said input planet carrier being cantilevered and extends axially outside of said stationary spindle;
a portion of said input planet carrier resides within said stationary spindle; and,
said at least one other stage includes an output carrier and said output carrier is fixed to said stationary spindle.

19. The planetary wheel drive as claimed in claim 18, further comprising:
said output carrier includes an internal spline and said stationary spindle includes an external spline, and said external spline of said stationary spindle is in meshing engagement with said internal spline of said output carrier fixing said output carrier to said stationary spindle.

20. The planetary wheel drive as claimed in claim 19, further comprising:
said input sun gear, input planet gear and said input planet pin residing within said spindle and said portion of said input planet carrier residing within said stationary spindle enables said planetary wheel drive to be compact.

* * * * *

UNITED STATES PATENT AND TRADEMARK OFFICE
CERTIFICATE OF CORRECTION

PATENT NO. : 10,093,177 B2
APPLICATION NO. : 15/451325
DATED : October 9, 2018
INVENTOR(S) : Martin et al.

It is certified that error appears in the above-identified patent and that said Letters Patent is hereby corrected as shown below:

In the Specification

Column 12, Line 50, after "312" insert --.--.

Column 14, Line 31, after the first occurrence of "plate" delete "1015" and insert --101S-- therefor.

Column 14, Line 33, before "and" delete "1015" and insert --101S-- therefor.

Column 14, Line 36, after "plate" delete "1015" and insert --101S-- therefor.

Column 14, Line 56, after "shoulder" delete "1012" and insert --101Z-- therefor.

Column 14, Line 61, after "shoulder" delete "1012" and insert --101Z-- therefor.

Column 14, Line 62, after "plate" delete "1015" and insert --101S-- therefor.

Column 15, Line 28, after "plate" delete "1015" and insert --101S-- therefor.

Column 16, Line 14, delete "1015," and insert --101S,-- therefor.

Column 16, Line 20, delete "1012," and insert --101Z,-- therefor.

Column 16, Line 28, after "104B," delete "2046," and insert --204B,-- therefor.

Signed and Sealed this
Sixteenth Day of April, 2019

Andrei Iancu
*Director of the United States Patent and Trademark Office*